US012489633B1

(12) United States Patent
Arkoff et al.

(10) Patent No.: US 12,489,633 B1
(45) Date of Patent: Dec. 2, 2025

(54) SYSTEM FOR FEDERATED COMPLIANCE-TOKEN INHERITANCE, DIGITAL ARTIFACT REGISTRY, AND MONETIZATION IN REGULATED ENVIRONMENTS USING LARGE LANGUAGE MODELS

(71) Applicant: OneSource Solutions International, Inc., Sudbury, MA (US)

(72) Inventors: Harold Arkoff, Sudbury, MA (US); Vedran Jukic, Trieste (IT)

(73) Assignee: OneSource Solutions International, Inc., Sudbury, MA (US)

( * ) Notice: Subject to any disclaimer, the term of this patent is extended or adjusted under 35 U.S.C. 154(b) by 0 days.

(21) Appl. No.: 19/278,692

(22) Filed: Jul. 23, 2025

Related U.S. Application Data

(63) Continuation-in-part of application No. 18/680,985, filed on May 31, 2024, now Pat. No. 12,380,144.

(51) Int. Cl.
*H04L 9/32* (2006.01)
*G06F 21/62* (2013.01)

(52) U.S. Cl.
CPC ........ *H04L 9/3213* (2013.01); *G06F 21/6254* (2013.01); *H04L 9/3247* (2013.01)

(58) Field of Classification Search
CPC .. H04L 9/3213; H04L 9/3247; G06F 21/6254
(Continued)

(56) References Cited

U.S. PATENT DOCUMENTS 12,124,592 B1 * 10/2024 O'Hern ................. G06N 20/00
2015/0269383 A1 * 9/2015 Lang ....................... G06F 21/57
726/1
(Continued)

OTHER PUBLICATIONS

Alex Norta; Commercial Property Tokenizing With Smart Contracts; IEEE:2018; pp. 1-8.*

*Primary Examiner* — Monjur Rahim
(74) *Attorney, Agent, or Firm* — IP Consulting Group; Michael Razavi

(57) ABSTRACT

A computerized platform enables secure, policy-compliant creation, governance, and monetization of digital artifacts produced by AI-driven "persona" agents in regulated domains (e.g., healthcare, finance). For each agent session, a federated compliance-token generator issues a cryptographically signed token embedding the full delegation chain, credential lineage, real-time policy snapshot, monetization rules, expiration and revocation data. As artifacts or workflows cross organizational or jurisdictional boundaries, a token inheritance module can subdivide, transfer, renew, or revoke the token while appending each event to an immutable, cryptographically linked audit trail. Every agent output is encapsulated as a digitally signed artifact that is indelibly linked to its originating compliance token and enriched with provenance, consent, and service metadata. A permissioned blockchain (or sharded distributed ledger) functions as an asset registry that immutably stores artifacts, tokens, and chronological records of creation, access, transfer, consent change, and policy updates. A smart-contract engine automates revenue allocation and settlement, ensuring continuous traceability, privacy protection, and financial compliance across institutional boundaries.

19 Claims, 9 Drawing Sheets

(58) Field of Classification Search
USPC .......................................................... 713/172
See application file for complete search history.

(56) References Cited

U.S. PATENT DOCUMENTS

| | | | |
|---|---|---|---|
| 2018/0007059 A1* | 1/2018 | Innes | G06F 21/6218 |
| 2021/0374693 A1* | 12/2021 | La Salle | G06Q 20/0655 |
| 2024/0095315 A1* | 3/2024 | Bartfai-Walcott | G06F 21/107 |
| 2024/0265346 A1* | 8/2024 | Albright | G06Q 10/0875 |
| 2025/0021534 A1* | 1/2025 | Schlicher | G06F 16/219 |
| 2025/0118432 A1* | 4/2025 | Welser, IV | G16H 50/70 |
| 2025/0141857 A1* | 5/2025 | Lu | H04L 63/08 |
| 2025/0165226 A1* | 5/2025 | Roper, Jr. | G06N 3/105 |
| 2025/0272652 A1* | 8/2025 | Makhija | G06F 40/205 |

\* cited by examiner

SYSTEM FOR FEDERATED COMPLIANCE-TOKEN INHERITANCE, DIGITAL ARTIFACT REGISTRY, AND MONETIZATION IN REGULATED ENVIRONMENTS USING LARGE LANGUAGE MODELS

CROSS-REFERENCE TO RELATED APPLICATIONS

This application is a Continuation-in-Part of U.S. application Ser. No. 18/680,985 (filed May 31 2024, entitled "System and Method for Medical Data Governance Using Large Language Models"), which itself is a continuation of U.S. application Ser. No. 18/417,511 (filed Jan. 19 2024, now U.S. Pat. No. 12,001,464, issued Jun. 4 2024).

FIELD OF TECHNOLOGY

The present invention relates to digital compliance, data-asset governance, and revenue management in highly regulated domains—including but not limited to healthcare, finance, and government. More specifically, the invention concerns a policy-driven framework for the creation, inheritance, renewal, revocation, transfer, and monetization of cryptographically bound "compliance tokens" and the digital artifacts generated by autonomous or semi-autonomous persona agents (AI software entities) operating across institutional and jurisdictional boundaries. The invention integrates edge-privacy processing, distributed-ledger asset registration, smart-contract billing, and fail-safe audit logging to ensure continuous provenance, consent, and regulatory conformity throughout an artifact's life-cycle.

BACKGROUND

Regulated industries such as healthcare, finance, and government are rapidly adopting autonomous and semi-autonomous software "persona agents" that perform tasks once handled exclusively by humans—drafting clinical notes, assembling transaction records, issuing regulatory filings, and even capturing patient consents at the point of care. These agents constantly cross institutional, geographic, and jurisdictional boundaries, which subjects every piece of data they touch to a shifting mosaic of privacy statutes (e.g., HIPAA, GDPR), sector-specific rules (e.g., PCI-DSS, SOX), and contractual obligations. Although existing electronic-record systems, consent-management platforms, and blockchain ledgers each address fragments of the compliance puzzle, none of them provides a unified mechanism that attaches a verifiable chain of delegation, policy context, consent status, and monetization rights to every agent session and to every digital artifact produced along the way.

Today's solutions suffer from four systemic gaps. First, most handle authorization statically—an agent is either allowed or not allowed to perform a task—without recording how that authorization was handed off, renewed, or revoked as the workflow progressed across organizations. Second, privacy controls are often applied after the fact; sensitive inputs such as biometric streams or raw medical images may be shipped upstream for central processing, creating both security exposure and regulatory risk. Third, monetization logic—royalty splits, usage fees, cross-license billing—operates in a separate commercial layer that cannot "see" the provenance or consent state of the data being monetized, leading to revenue leakage and audit headaches. Finally, when networks partition or a credential is suddenly revoked, conventional audit logs provide only retrospective evidence; they do not actively enforce state integrity, leaving a window in which stale or unauthorized artifacts can propagate.

Given the stakes—missteps can trigger patient-safety incidents, financial penalties, or criminal liability—there is an urgent need for an architecture that binds credential lineage, privacy guarantees, consent verification, and billing terms directly into the cryptographic DNA of each agent interaction and artifact. Such an approach must operate in real time, survive outages, and scale across heterogeneous technology stacks and regulatory regimes.

BRIEF SUMMARY OF THE DISCLOSURE

The invention provides an end-to-end, policy-driven framework that governs the entire life-cycle of AI-generated digital artifacts in mission-critical, highly regulated environments. At its core lies a proxied compliance-token architecture in which every persona-agent session is issued a cryptographically signed token that captures (i) the full delegation chain and credential lineage leading to that agent, (ii) a hash of an active policy stack—privacy directives, consent requirements, jurisdictional constraints, retention rules, and export controls—at the moment of issuance, (iii) monetization logic that expresses royalty formulas, cost-sharing arrangements, or value-based reimbursement rates, and (iv) explicit expirations, revocation hooks, and renewal thresholds. Because tokens are "proxied," they can be inherited, subdivided, or re-issued as a workflow jumps from one organization or legal domain to another, yet each hop is immutably chained into a Token Audit Trail maintained on a fault-tolerant, distributed ledger.

Whenever an agent produces a digital artifact—whether it is a radiology report, bank-transaction bundle, regulatory filing, or dynamically generated consent form—the system automatically binds the artifact to the originating compliance token, computes a tamper-evident content hash, and registers the artifact in a distributed Asset Registry. The registry, which may reside on a permissioned blockchain or a sharded ledger cluster, stores provenance metadata, ownership state, access rights, and policy fingerprints. It also embeds live pointers to the token's revocation and renewal status so that downstream systems can refuse stale or non-compliant artifacts in real time.

Privacy is enforced "by construction" through an edge inference layer: raw sensor, imaging, or biometric inputs are kept inside a local privacy boundary where an on-premise engine derives only the minimal reporting features needed for the task at hand. The boundary simultaneously emits cryptographic attestations that the raw data never left the enclave and logs every transformation step—model weights, thresholds, differential-privacy noise seeds, and audit flags—into the ledger. This guarantees compliance with frameworks such as GDPR's data-minimization principle or HIPAA's minimum-necessary rule, while still allowing federated analytics and cross-site machine-learning aggregation.

Integrated with both the token ledger and the asset registry is a smart-contract monetization engine (954). Upon each artifact creation, transfer, or invocation, this engine reads the monetization fields embedded in the compliance token and executes deterministic contracts that can allocate revenue in near real time—splitting fees across hospitals, vendors, data trustees, or patient wallets; applying tiered pricing based on usage intensity or clinical acuity; or reconciling value-based outcomes payments. Because the contract execution is atomic with the compliance check, an artifact cannot be used unless it is simultaneously billed (if required) and proven to conform to the governing policy snapshot and active consents.

Operational continuity is preserved through automated role-switch and fail-over protocols in the registry layer; if a node or network segment goes down, consensus is re-established among surviving nodes, and token/artifact state continues to advance without risking forked histories. All significant events—token issuance, hand-off, revocation, artifact creation, access, policy update, contract execution—are chained into a cryptographically linked audit ledger that regulators, internal auditors, or third-party custodians can query with provable completeness guarantees.

Collectively, these capabilities allow organizations to deploy autonomous agents, exchange their outputs, and monetize their intellectual value across institutional and jurisdictional boundaries—while retaining verifiable control over privacy, consent, regulatory compliance, provenance, billing accuracy, and audit integrity. The invention therefore delivers a scalable, self-enforcing trust fabric for digital operations in healthcare, finance, government, and any other sector where AI must perform within strict legal and ethical constraints.

DETAILED DESCRIPTION OF THE DISCLOSURE

System Overview

The present invention introduces a fundamentally new approach to federated compliance, digital artifact governance, and automated monetization of AI-generated outputs in regulated, multi-organizational environments. Unlike conventional systems, which may address audit, asset management, or billing in isolation, this invention provides an integrated framework that unites federated compliance tokenization, secure artifact registry, privacy enforcement, consent management, dynamic monetization, and cryptographically chained audit into a seamless, policy-driven system.

Figure 7:
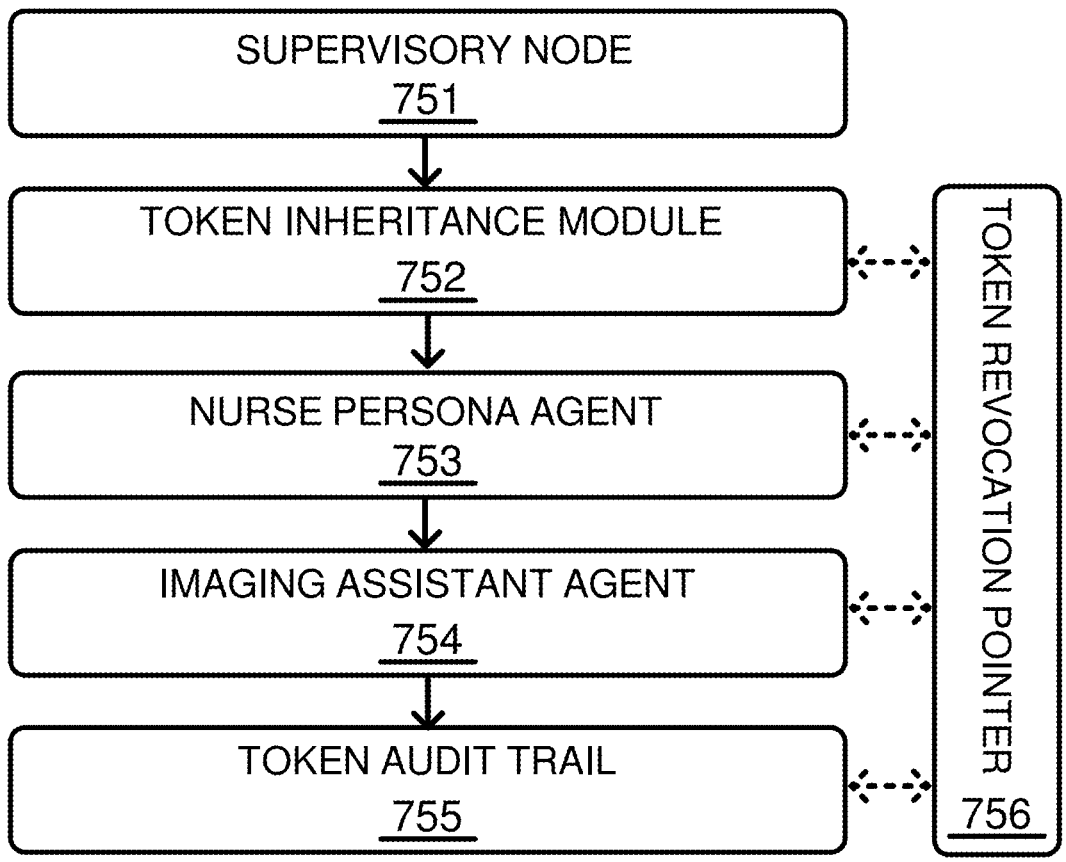
FIG. 7 is a block diagram that illustrates vertical delegation and proxied security-token inheritance across organizational and workflow boundaries, in accordance with an exemplary embodiment of the disclosure.

A key novelty lies in the use of proxied security tokens (also referred to throughout this description as federated compliance tokens) that immutably encode delegation chains, credential lineage, policy state, monetization logic, and revocation data, and are inherited or updated as workflows traverse organizational boundaries. Basically, proxied security token (referred to as federated compliance token) is a digitally signed, cryptographically secure token that encapsulates the delegation chain, credential lineage, policy snapshot, monetization policy, expiration, revocation status, and digital signature for a persona agent session or output. To simply put, credential lineage is a record of the origins, transfers, and updates of credentials or privileges associated with a persona agent, session, or artifact, used for policy enforcement and audit. Delegation chain refers to recorded sequence of entities (e.g., users, supervisors, agents) through which authority, credentials, or operational responsibility have been delegated in a given workflow, as cryptographically documented in the token and audit trail (FIG. 7, 755). Policy snapshot is a cryptographically recorded representation of the policy rules, risk classification, consent requirements, and operational parameters, in effect, at the time a token or artifact is created or transferred. Persona agent is a software entity, powered by an artificial intelligence or large language model, instantiated to perform decision-making, workflow, or communication tasks, and capable of generating digital outputs ("artifacts") subject to policy and regulatory governance. The token is dynamically generated, inherited, transferred, renewed, or revoked as workflows and agent outputs move across organizational boundaries. Each AI-generated digital artifact is cryptographically linked to its compliance token, ensuring provenance, access control, and regulatory context are preserved across its entire lifecycle. A digital artifact (FIG. 9, 952) is a digitally signed record, report, consent, or other output generated by a persona agent, cryptographically linked to its originating compliance token and including provenance, policy, credential, and service metadata.

The framework is underpinned by a distributed asset registry that immutably records artifact creation, transfer, ownership, access, and monetization events, all enforced via programmable smart contracts and auditable in real time. To simply put, asset registry (referred to as distributed ledger—FIG. 9, 953) is a decentralized, tamper-evident, and cryptographically chained database or blockchain system for storing, indexing, and tracking digital artifacts, compliance tokens, ownership, transfer, access, and monetization events. Smart Contract is a self-executing, cryptographically verifiable code artifact stored on the asset registry or distributed ledger, which automatically enforces compliance, monetization, consent, or transfer policies for digital artifacts and tokens. Automated billing and revenue-sharing logic is tightly integrated with artifact access and usage, eliminating manual reconciliation and reducing administrative burden.

By incorporating edge privacy-preserving inference, dynamic consent enforcement, audit logging at every workflow step, and resilient fail-over for operational continuity, the invention delivers a complete, scalable, and secure solution for managing AI-generated digital assets. It enables organizations to comply with diverse regulatory frameworks, support multi-party workflows, and realize new revenue streams from digital artifacts, all while maintaining end-to-end traceability and auditability.

These technical advancements provide fundamentally superior integration, automation, and policy enforcement compared with prior systems by solving three critical gaps: the absence of a verifiable end-to-end chain of delegation and credential lineage, the lack of real-time privacy-preserving provenance and consent enforcement at the moment of data creation, and the persistent disconnection between compliance state and monetization logic. By closing these gaps, the invention overcomes the operational, regulatory, and commercial challenges that have long hindered digital-asset management in the AI era. This technical synergy guarantees atomic, consistent, and auditable state management across distributed environments—even during network faults or operational failover—delivering a level of trusted interoperability and assurance not achieved in the prior art.

To demonstrate real-world implementation of the integrated framework, its application within an exemplary Medical Data Governance (MDG) environment is detailed below. The federated-token architecture dovetails seamlessly with existing Medical-Data Governance (MDG) systems, described in the following description. As the discussion transitions to the MDG environment, it becomes apparent how federated compliance tokens augment large-language-model (LLM)—driven medical-data retrieval, consent handling, and monetization at scale.

The present invention provides an integrated system and method for federated compliance, inheritance, and monetization of digital artifacts, particularly those generated by persona agents operating in regulated, multi-institutional environments such as healthcare. Building upon foundational agent governance and audit frameworks, this invention addresses critical gaps in digital asset management, secure transfer, and monetization of AI-generated outputs across organizational boundaries, especially within complex ecosystems like the Medical Data Governance (MDG) environments detailed below.

The system introduces proxied security tokens (also referred to as federated compliance tokens) that encapsulate delegation chain, credential lineage, policy snapshot, monetization policy, expiration, revocation status, and digital signature for every agent session or output. These tokens are dynamically generated, inherited, revoked, or renewed as digital artifacts and workflows traverse institutional, regulatory, and geographic domains. Token issuance, delegation, transfer, and revocation are fully auditable and cryptographically enforced, ensuring compliance and traceability at all times (see FIG. 7).

Digital artifacts, such as consent forms, clinical reports, or compliance records generated within an MDG framework—are created by persona agent instances and registered in a distributed asset registry. Each artifact is cryptographically linked to its originating compliance token. The registry supports immutable tracking of artifact provenance, ownership, transfer, consent, and access, and is implemented as a tamper-evident distributed ledger or blockchain (see FIG. 9).

The system further incorporates a dynamic monetization engine (also referred to as billing engine—FIG. 9, 954), enabling automated enforcement of revenue-sharing, billing, or royalty arrangements based on artifact usage, institutional policy, and regulatory requirements. Monetization events are governed by smart contracts or programmable logic within the registry and are audit-logged in real time. To simply put, monetization engine (also known as billing engine) is a module or subsystem that calculates and enforces billing, royalty, or revenue-sharing rules associated with the access or use of digital artifacts, based on usage metrics, roles, institutional agreements, or regulatory policies.

Figure 8:
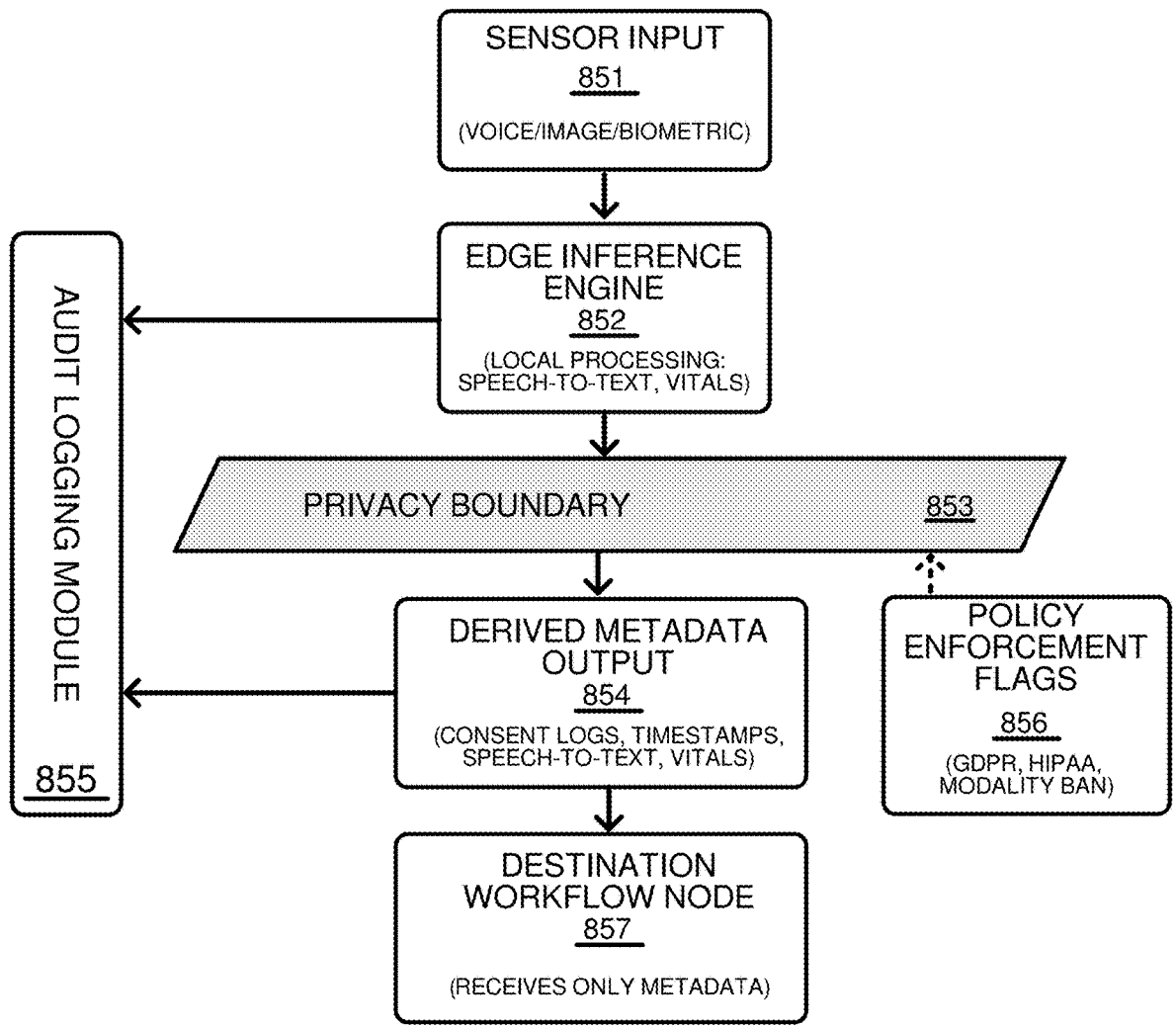
FIG. 8 is a system diagram that illustrates edge privacy-preserving processing and a workflow node interface, in accordance with an embodiment of the disclosure.

Privacy and regulatory compliance are maintained via edge privacy-preserving processing, where sensitive sensor or clinical data is processed locally, with only derived, policy-compliant metadata transmitted for downstream workflows (see FIG. 8). Every event in the artifact lifecycle—generation, tokenization, transfer, access, monetization, review, consent, or revocation—is recorded in a distributed, cryptographically chained audit ledger.

Through its tightly integrated architecture, the invention delivers a scalable, secure, and fully auditable platform for federated governance of persona-agent outputs—supporting cross-institutional collaboration, policy-enforced artifact transfer, automated compliance, and revenue allocation in mission-critical settings. The solution is realized as a constellation of interoperable modules that enforce policy-driven control over digital artifacts and their companion compliance tokens as those assets flow among independent organizations, thereby furnishing continuous governance, dynamic token inheritance, real-time regulatory enforcement, and smart-contract monetization from creation through access and archival. Although the description focuses on a healthcare MDG deployment, the proxied security-token/distributed-registry/monetization core constitutes a universal framework capable of extending auditable AI-asset management to finance, supply-chain, government, and other sectors where regulatory rigor and cross-organizational trust are paramount.

Exemplary Environment for Medical Data Governance

Figure 1:
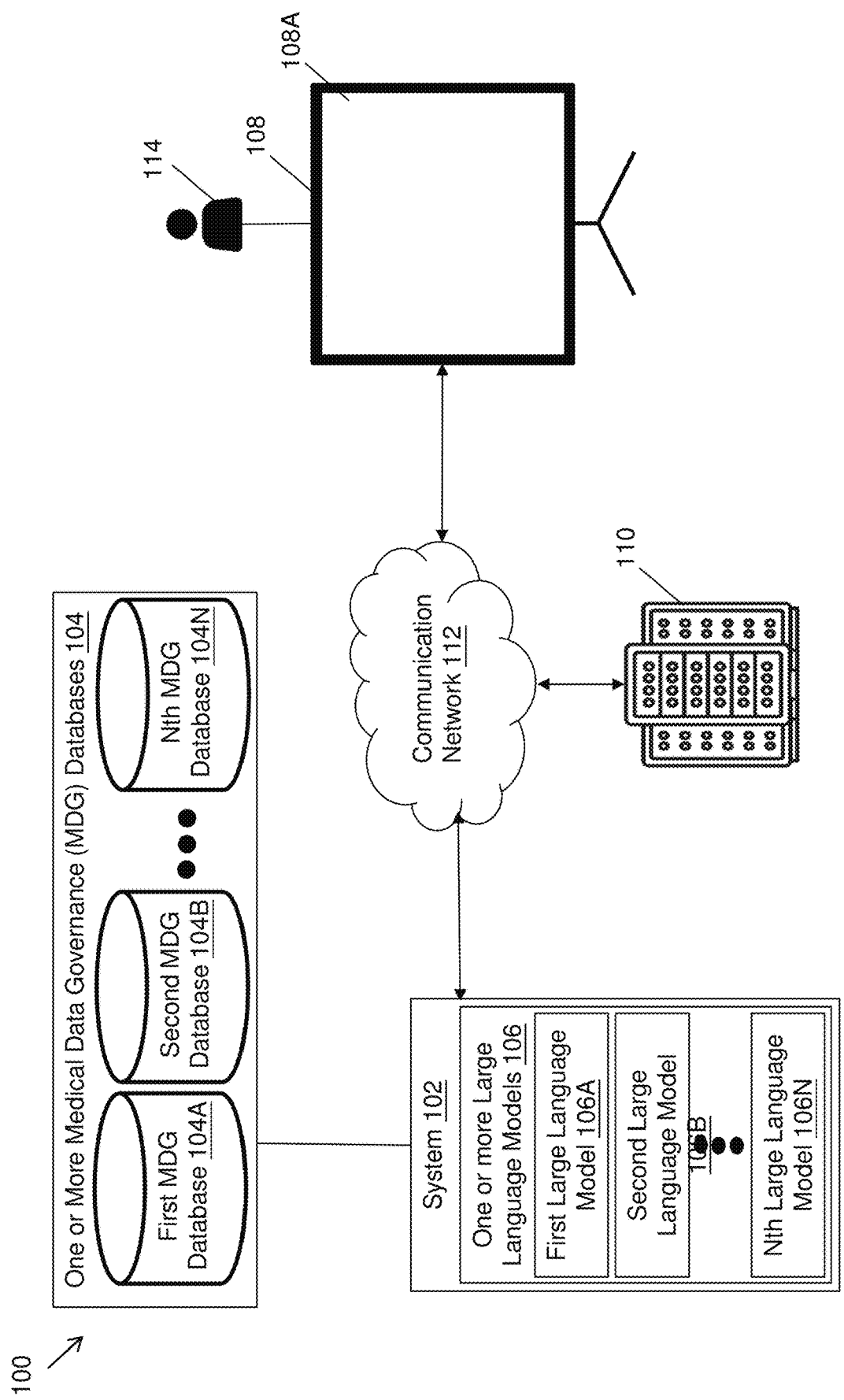
FIG. 1 is a block diagram that illustrates an implementation of the integrated proxied security token framework within an exemplary environment for medical data governance using large language models, in accordance with an exemplary embodiment of the disclosure.

FIG. 1 is a block diagram that illustrates an implementation of the integrated proxied security token framework within an exemplary environment for medical data governance using large language models. In FIG. 1, in an exemplary deployment scenario, a system 102 issues a proxied security token at the outset of each LLM-mediated query session, thereby encoding the delegation chain, credential lineage, active privacy-and-consent snapshot, and monetization logic that will govern the session. That token accompanies every request routed to the distributed MDG databases 104, whose individual instances enforce tokenized access control in accordance with local policies and jurisdictional rules. FIGS. 2-5 expand this baseline by detailing the hardware architecture (FIG. 2), the LLM-driven query, metadata, and edge-inference operations (FIGS. 3-5), and the generation of structured numerical-data descriptions that are likewise bound to the originating proxied security token. FIG. 6 then provides a use-case scenario in which a clinician employs the system to locate sepsis candidates across multiple institutions; each query, database retrieval, and generated artifact inherits the cryptographic provenance, consent status, and smart-contract billing terms embedded in the governing token. The foundational proxied security token/registry/monetization mechanisms that enable such cross-institutional trust are presented in FIGS. 7-9, where the token inheritance module, distributed asset registry, monetization engine, and audit ledger are shown operating in concert to preserve end-to-end compliance, automate revenue allocation, and furnish tamper-evident traceability.

Figure 9:
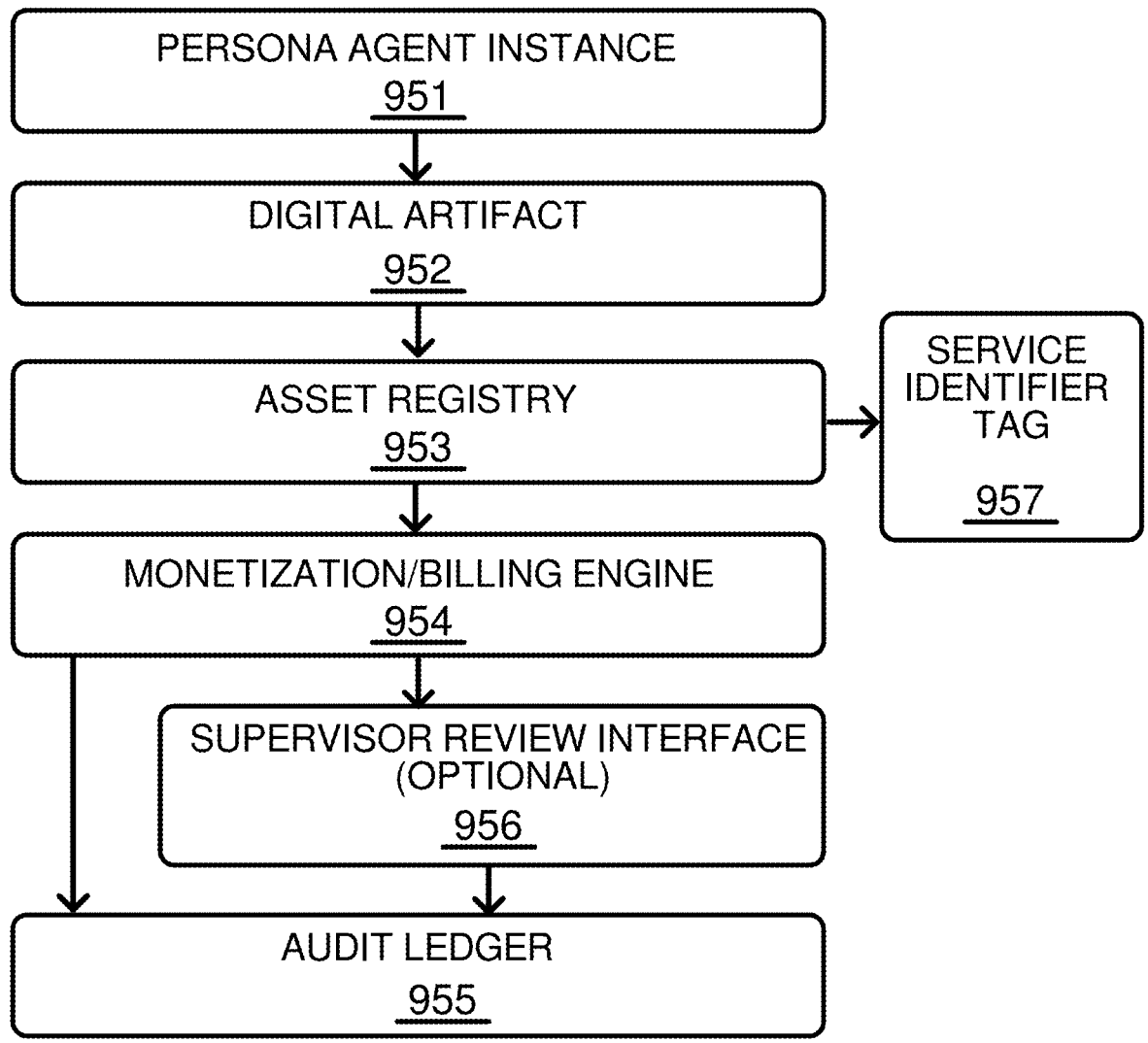
FIG. 9 is a block-and-data-flow diagram that illustrates digital artifact generation, distributed asset registry, and a monetization engine, in accordance with an embodiment of the disclosure.

Collectively, FIGS. 1-6 illustrate the front-end MDG workflow, while FIGS. 7-9 reveal the underlying token, registry, and audit infrastructure that generalizes this approach to any domain requiring verifiable, policy-driven governance of AI-generated digital artifacts.

Medical Data Governance may be important for several reasons, including protecting the privacy of patients, ensuring the quality of data, and promoting the ethical use of data. For example, medical data governance helps to protect the privacy of patients by ensuring that their data is collected, stored, and used responsibly. This includes de-identifying data before it is shared with researchers or other third parties. Also, medical data governance helps to ensure the quality of data by ensuring that it is collected, stored, and transmitted consistently and accurately. This helps to reduce the risk of errors and bias in research findings. Furthermore, medical data governance helps to promote the ethical use of data by ensuring that it is used for legitimate purposes and that it is not shared with unauthorized parties. This helps to protect the public trust and to ensure that research is conducted responsibly.

FIG. 1 is a block diagram that illustrates an implementation of the integrated proxied security token framework within an exemplary environment for medical data governance using large language models, in accordance with an exemplary embodiment of the disclosure. Referring to FIG. 1, there is shown a network environment 100, which may include a system 102, one or more medical data governance (MDG) databases 104, one or more large language models (LLMs) 106, a user device 108 that includes a display device 108A, a server 110, and a communication network 112. The one or more MDG databases 104 may include a first MDG database 104A, a second MDG database 104B, up to an Nth MDG database 104N. Similarly, the one or more LLMs 106 may include a first LLM 106A, a second LLM 106B, a third LLM 106C, up to an Nth LLM 106N. With reference to FIG. 1, there is further shown a user 114 associated with the user device 108.

The system 102 may comprise suitable logic, circuitry, interfaces, and/or code that is configured to receive a user input including at least one search query to retrieve first medical data from the one or more MDG databases 104. The first medical data corresponds to the information that may be requested by the user. In some embodiments, the system 102 is further configured to apply the one or more LLMs 106 on the received at least one search query. The system 102 is further configured to determine metadata associated with the at least one search query based on the application of the one or more LLMs 106 on the received search query. The system 102 is further configured to query at least the first MDG database 104A of the one or more MDG databases 104 based on the determined metadata to retrieve the first medical data. The system 102 is further configured to output the retrieved first medical data. Examples of the system 102 may include, but are not limited to, a computing device, a mainframe machine, a server, a computer workstation, a smartphone, a cellular phone, a mobile phone, a gaming device, and/or a consumer electronic (CE) device with image processing capabilities.

In an embodiment, the system 102 may correspond to an MDG system that may enable medical data governance (MDG). As discussed above, MDG provides a true source of data that can highlight the schedule of medical treatments and provides tools for rescheduling feedback, and from contacting receiving feedback patients/physicians/healthcare professionals thus introducing general system flexibility through the use of lean process and six sigma methods. MDG leverages modern communication methods (phone apps, emails, web services, etc.) and easily links patient's physicians, or other healthcare professionals to the scheduled use of medical devices. After unexpected events that may cause a miss in scheduled operations, the MDG may create a backup schedule to pre-emptively fill the gaps and may facilitate healthcare and schedule professionals to optimize machine time usage. This could create a new marketplace for priority services for those patients who opt for it.

Also, MDG may enable patients/users and or institutions to monetize their vital, medically relevant, patient data collected during the stay inside the healthcare institution, as well through the extended data collected over some time in multiple stays or spot measurements in healthcare institutions. Patients may be able to establish a relationship with a third party (such as a drug manufacturer, independent drug trial projects, undisclosed trials to the institution) and provide to the third party normalized data collected, organized, and provided by the MDG used by the healthcare institution, and provided to the patient in a different standardized format, even in near real-time. The institution might not be aware of the final user of the patient data. MDG can create additional revenue for the institution by charging such a service per patient and data processed. MDG can track and trace data usage per patient and assets. MDG through the export of all specific, validated clinical data, and medical relevant data, could create a new data-based economy.

Furthermore, MDG manages patient consent and approval, or notification for the use of the patient data for second opinions, medical treatments, specific research, validation projects, and educational purposes. Specific patient or user data is previously screened based on always updated, public, generic, anonymous metadata (for example: sex, age, days in hospital, normalized data content and length: heart rate, respiration rate, drugs, etc.). MDG can handle patient consent using modern communication methods (phone apps, emails, web services, etc.) and provide patient consent for his data to be used in a specific research or validation project, with or without compensation. MDG can provide patient consent and access to the data to specific users, like doctors, physicians, and other specific medical professionals. MDG can provide specific code associated with the data, that, based on necessity, can provide, if granted by the user or proxy consent, protected personal identification, family relations, or other protected personal data. MDG may allow for third-party statistical analysis (research) on the whole population dataset, without exporting or providing data to the third party, but rather comparing the result to the legally available consent subset group. A statistically relevant result might indicate a minimal group of statistically significant subset of data to search consent and optimize the time for valid and repeatable datasets.

Each of the one or more MDG databases 104 may correspond to a structured collection of organized information stored electronically in a way that enables easy access, retrieval, and manipulation of medical data. The one or more MDG databases 104 may serve as a centralized database where the medical data may be systematically arranged into tables, records, and fields, following a predefined data model. The one or more MDG databases 104 may be designed to efficiently manage vast amounts of information, allowing users to perform queries, insert new data, update existing records, and delete information based on specific requirements. In an embodiment, the one or more MDG databases 104 may correspond to a storage system associated with the MDG. Examples of different types of the one or more MDG databases 104 may include, but are not limited to, a relational database, a non-relational database, a document database, and a graph database.

Each of the one or more LLMs 106 may correspond to a sophisticated artificial intelligence (AI) system trained on vast amounts of text data, capable of understanding, generating, and processing human-like language at an extensive scale. Each of the one or more LLMs 106 models utilizes deep learning techniques, particularly transformer architectures, enabling them to grasp context, syntax, semantics, and even nuances in language usage. The primary function of the one or more LLMs 106 may involve, but is not limited to, natural language processing tasks like text generation, translation, summarization, and sentiment analysis. Each of the one or more LLMs 106 may learn to predict and generate text by analysing patterns and relationships within the massive corpus of text they've been trained on. Examples of different types of the one or more LLMs 106 may include, but are not limited to, a Transformer-Based Model, a Bidirectional Encoder Representations from Transformers (BERT) model, a Generative Pre-trained Transformer (GPT) model, a Unified Language Model, and a Text-to-Text Transfer Transformer (T5) model.

In an embodiment, each of the one or more LLMs 106 may include a neural network that may be a computational network or a system of artificial neurons, arranged in a plurality of layers, as nodes. The plurality of layers of each of the neural network may include an input layer, one or more hidden layers, and an output layer. Each layer of the plurality of layers may include one or more nodes (or artificial neurons). Outputs of all nodes in the input layer may be coupled to at least one node of hidden layer(s). Similarly, inputs of each hidden layer may be coupled to outputs of at least one node in other layers of the corresponding neural network. Outputs of each hidden layer may be coupled to inputs of at least one node in other layers of the corresponding neural network. Node(s) in the final layer may receive inputs from at least one hidden layer to output a result. The number of layers and the number of nodes in each layer may be determined from hyper-parameters of the corresponding neural network model. Such hyper-parameters may be set before or while training the corresponding neural network model on a training dataset. The neural network may correspond to a mathematical function (for example, a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other layer(s) (for example, previous layer(s)) of the corresponding neural network model. All or some of the nodes of the each of the set of neural network models may correspond to the same or different mathematical function. In training of the neural network, one or more parameters of each node of the corresponding neural network may be updated based on whether an output of the final layer for a given input (from the training dataset) matches a correct result based on a loss function for the corresponding neural network. The above process may be repeated for the same or a different input until a minima of loss function may be achieved, and a training error may be minimized. Several methods for training are known in art, for example, gradient descent, stochastic gradient descent, batch gradient descent, gradient boost, meta-heuristics, and the like.

Each of the set of neural network may include electronic data, such as a software program, code of the software program, libraries, applications, scripts, or other logic or instructions for execution by a processing device, such as hardware processor. Each of the set of neural network models includes code and routines configured to enable a computing device, such as the system 102, to perform one or more operations. Additionally or alternatively, the neural network may be implemented using hardware including a processor, a microprocessor, a field-programmable gate array (FPGA), or an application-specific integrated circuit (ASIC) to perform or control performance of one or more operations. Alternatively, in some embodiments, each of the neural network model may be implemented using a combination of hardware and software. Although in FIG. 1, the one or more LLMs 106 are shown as integrated within the system 102, the disclosure is not so limited. Accordingly, in some embodiments, the one or more LLMs 106 may be associated with the system 102, without deviation from the scope of the disclosure. In an embodiment, the one or more LLMs 106 may be stored in the server 110.

The user device 108 may include suitable logic, circuitry, interfaces, and/or code that is configured to receive one or more user inputs (for example at least one search query) from the user 114 and transmit the received one or more user inputs to the system 102. The system 102 is further configured to display the first medical data on the display device 108A associated with the user device 108. Examples of the user device 108 may include, but are not limited to, a computing device, a computer work-station, a smartphone, a cellular phone, a mobile phone, a gaming device, a consumer electronic (CE) device, a mainframe machine, or a server. The display device 108A may comprise suitable logic, circuitry, and interfaces that is configured to display the first medical data. In accordance with an embodiment, the display device 108A may be a touch screen which may enable the user to provide the one or more user inputs via the display device 108A. The touch screen may be at least one of a resistive touch screen, a capacitive touch screen, or a thermal touch screen. The display device 108A may be realized through several known technologies. Examples of such technologies may include, but are not limited to, at least one of a Liquid Crystal Display (LCD) display, a Light Emitting Diode (LED) display, a plasma display, or an Organic LED (OLED) display technology, or other display devices.

The server 110 may include suitable logic, circuitry, and interfaces, and/or code that is configured to store the at least one search query. The server 110 is further configured to store the one or more MDG databases 104 and the one or more LLMs 106. In some embodiments, the server 110 is configured to train each of the one or more LLMs 106. The server 110 may be implemented as a cloud server and may execute operations through web applications, cloud applications, HTTP requests, database operations, file transfer, and the like. Other example implementations of the server 110 may include, but are not limited to, a database server, a file server, a web server, a media server, an application server, a mainframe server, or a cloud computing server. In at least one embodiment, the server 110 may be implemented as a plurality of distributed cloud-based resources by use of several technologies that are well known to those ordinarily skilled in the art. A person with ordinary skill in the art will understand that the scope of the disclosure may not be limited to the implementation of the server 110 and the system 102 as two separate entities. In certain embodiments, the functionalities of the server 110 can be incorporated in its entirety or at least partially in the system 102, without a departure from the scope of the disclosure.

The communication network 112 may include a communication medium through which the system 102, the one or more MDG databases 104, the one or more LLMs 106, the user device 108, the display device 108A, and the server 110 may communicate with each other. The communication network 112 may be one of a wired connection or a wireless connection. Examples of the communication network 112 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 is configured to connect to the communication network 112 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

Figure 2:
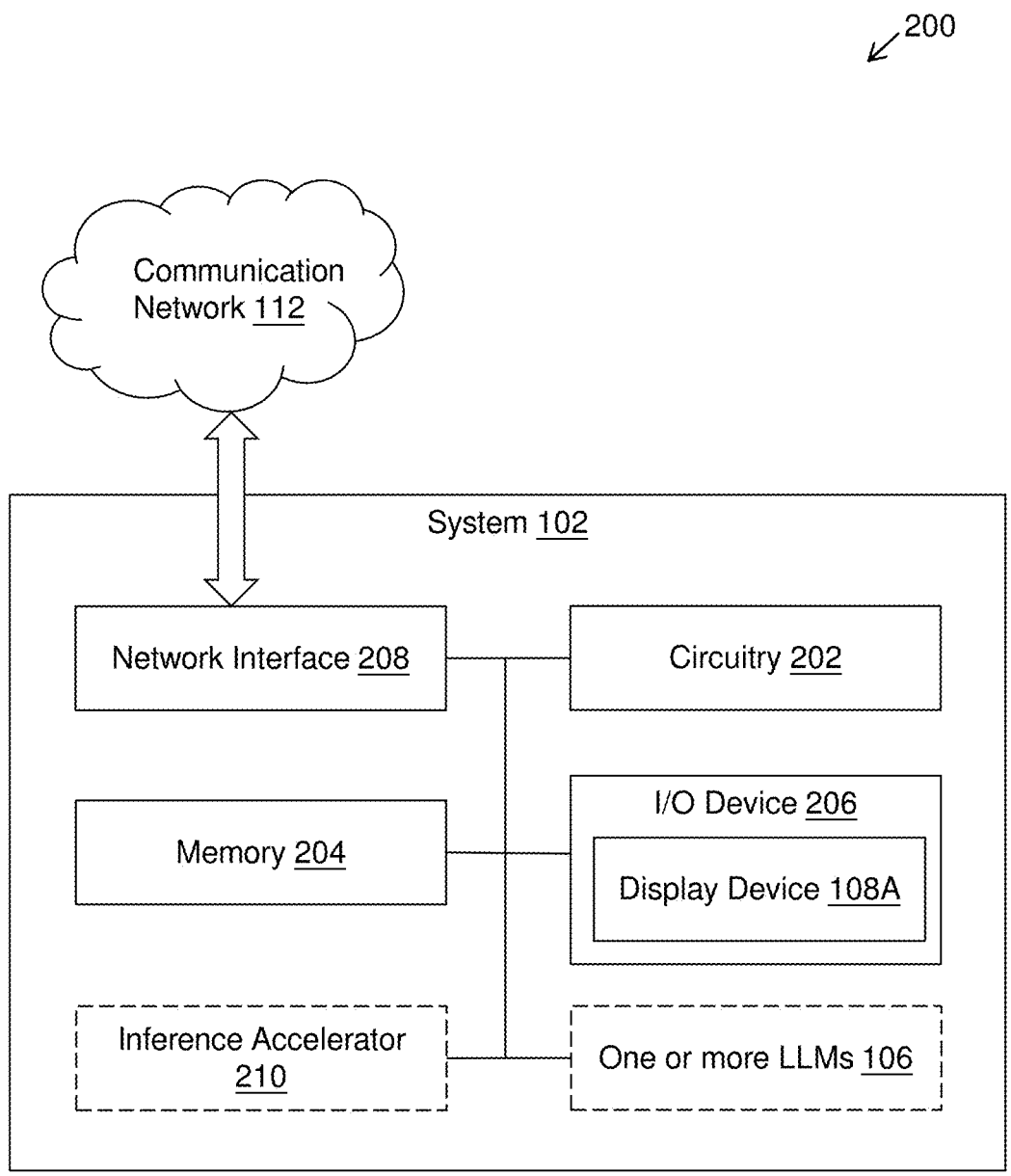
FIG. 2 is a block diagram that illustrates an exemplary system for medical data governance using large language models, in accordance with an embodiment of the disclosure.

FIG. 2 is a block diagram that illustrates an exemplary system for medical data governance using large language models, in accordance with an embodiment of the disclosure. FIG. 2 is explained in conjunction with elements from FIG. 1. With reference to FIG. 2, there is shown a block diagram 200 of the system 102. The system 102 may include a circuitry 202, a memory 204, an input/output (I/O) device 206, a network interface 208, an inference accelerator 210, and the one or more LLMs 106. The circuitry 202 may be communicatively coupled to the memory 204, the I/O device 206, the network interface 208, the inference accelerator 210, and the one or more LLMs 106. The circuitry 202 may include suitable logic, circuitry, and interfaces that is configured to execute program instructions associated with different operations to be executed by the system 102. For example, some of the operations may include, but are not limited to, receiving the user input, applying the one or more LLMs 106, determining metadata, querying the first MDG database 104A, and outputting the retrieved first medical data. The circuitry 202 may include one or more specialized processing units, which may be implemented as an integrated processor or a cluster of processors that perform the functions of the one or more specialized processing units, collectively. The circuitry 202 may be implemented based on a number of processor technologies known in the art. Examples of implementations of the circuitry 202 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other computing circuits.

The memory 204 may include suitable logic, circuitry, interfaces, and/or code that is configured to store the program instructions to be executed by the circuitry 202. In at least one embodiment, the memory 204 may store the at least one search query. The memory 204 may also store the one or more LLMs 106. In an embodiment, the memory 204 is further configured to store first medical data, raw data, and the one or more MDG databases 104. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card. The I/O device 206 may include suitable logic, circuitry, and interfaces that is configured to receive one or more user inputs and provide an output. For example, the system 102 may receive the user input via the I/O device 206. The I/O device 206 may further display the retrieved first medical data. The I/O device 206 which includes various input and output devices, is configured to communicate with the circuitry 202. Examples of the I/O device 206 may include, but are not limited to, a touch screen, a keyboard, a mouse, a joystick, a microphone, a display device, and a speaker.

The network interface 208 may include suitable logic, circuitry, and interfaces that is configured to facilitate a communication between the circuitry 202, the one or more MDG databases 104, the one or more LLMs 106, the user device 108, the display device 108A, and the server 110, via the communication network 112. The network interface 208 may be implemented by use of various known technologies to support wired or wireless communication of the system 102 with the communication network 112. The network interface 208 may include, for example, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 208 is configured to communicate via wireless communication with networks, such as the Internet, an Intranet, or a wireless network, such as a cellular telephone network, a public switched telephonic network (PSTN), a radio access network (RAN), a wireless local area network (LAN), and a metropolitan area network (MAN). The wireless communication may use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The inference accelerator 210 may include suitable logic, circuitry, interfaces, and/or code that is configured to operate as a co-processor for the circuitry 202 to accelerate computations associated with the operations of the each of the one or more LLMs 106. The inference accelerator 210 may implement various acceleration techniques, such as parallelization of some or all of the operations of the corresponding one or more LLMs 106. The inference accelerator 210 may be implemented as a software, a hardware, or a combination thereof. Example implementations of the inference accelerator 210 may include, but are not limited to, a GPU, a Tensor Processing Unit (TPU), a neuromorphic chip, a Vision Processing Unit (VPU), a field-programmable gate arrays (FGPA), a Reduced Instruction Set Computing (RISC) processor, an Application-Specific Integrated Circuit (ASIC) processor, a Complex Instruction Set Computing (CISC) processor, a microcontroller, and/or a combination thereof. The functions or operations executed by the system 102, as described in FIG. 2, may be performed by the circuitry 202. Various operations executed by the circuitry 202 are described in detail, for example, in FIGS. 3, 4, and 5.

In operation, the system 102 is configured to receive the user input including at least one search query to retrieve first medical data from one or more MDG databases 104. In an embodiment, the at least one search query is written in a first language. The first language may correspond to any natural language (say English). In an embodiment, the natural language may refer to a way humans may communicate using spoken or written words in everyday conversation(s). The natural language may have its grammar, vocabulary, syntax, and rules for constructing meaningful expressions, allowing individuals to convey complex ideas and emotions. Examples of the natural languages include English, Spanish, Mandarin, and the like. The system 102 is further configured to apply the one or more LLMs 106 on the received at least one search query. As discussed above, the one or more LLMs 106 may be pre-trained models. In an embodiment, the one or more LLMs 106 may get iteratively trained based on new user requests. The system 102 is further configured to determine metadata associated with the at least one search query based on the application of the one or more LLMs on the received search query. Based on the determined metadata, the system 102 is further configured to query the first MDG database 104A of the one or more MDG databases 106. The first MDG database 104A may be queried to retrieve the first medical data. The system 102 is further configured to output the retrieved first medical data. The output of the retrieved first medical data may correspond to the rendering of the first medical data on the display device 108A associated with the user device 108.

Figure 3:
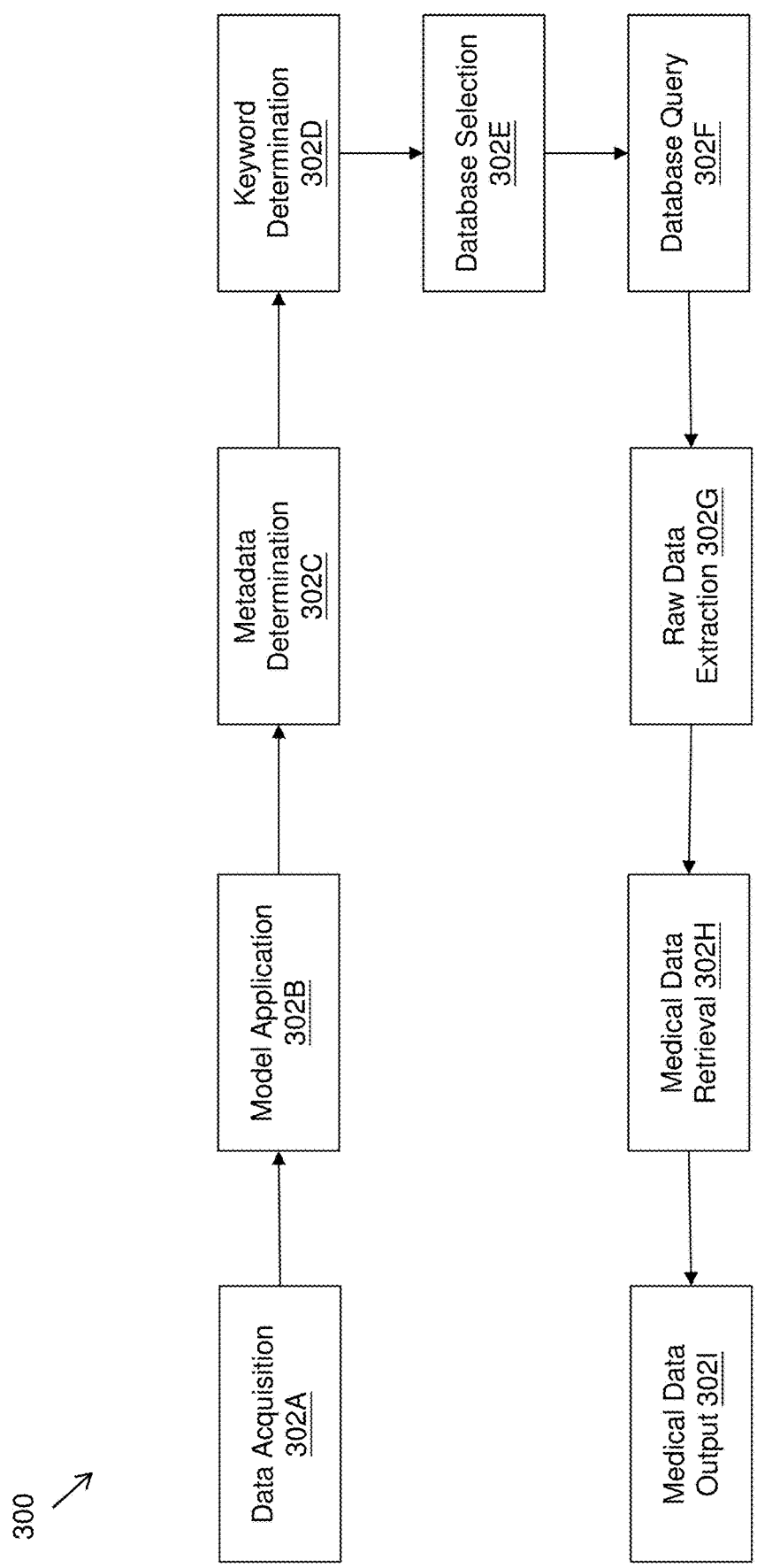
FIG. 3 is a diagram that illustrates exemplary operations for medical data governance using large language models, in accordance with an embodiment of the disclosure

FIG. 3 is a diagram that illustrates exemplary operations for medical data governance using large language models, in accordance with an embodiment of the disclosure. FIG. 3 is explained in conjunction with elements from FIG. 1 and FIG. 2. With reference to FIG. 3, there is shown a block diagram 300 that illustrates exemplary operations from 302A to 302I, as described herein. The exemplary operations illustrated in the block diagram 300 may start at 302A and may be performed by any computing system, apparatus, or device, such as by the system 102 of FIG. 1 or circuitry 202 of FIG. 2. Although illustrated with discrete blocks, the exemplary operations associated with one or more blocks of the block diagram 300 may be divided into additional blocks, combined into fewer blocks, or eliminated, depending on the particular implementation.

At 302A, a data acquisition operation may be performed. In data acquisition operation, the circuitry 202 is configured to receive the user input from the user 114 of the system 102. The user 114 may be, for example, a doctor, a physician, or any medical professional in a medical environment. In an embodiment, the user 114 may be a patient or any person from the general public. In an embodiment, the input may be received from the user device 108 via the communication network 112 and may include at least one search query that may be written in a first language (say English). As a first example, the at least one search query may be "Find me a patient that most probably has Sepsis." In an embodiment, the at least one search query may be received to retrieve the first medical data from the one or more MDG databases 104. Each MDG database of the one or more MDG databases 104 may include electronic medical records associated with at least one user. The electronic medical records (EMRs) may correspond to digital versions of the paper charts in a healthcare provider's office. Such EMRs may include a patient's medical history, diagnoses, medications, treatment plans, immunization dates, allergies, radiology images, laboratory test results, and the like. In an embodiment, the EMRs may allow for systematic storage, retrieval, and modification of patient data, making it easily accessible to authorized healthcare providers. In an embodiment, the one or more MDG databases 104 may correspond to a specific storage and retrieval tool that can work very efficiently with the one or more LLMs 106 to create an interface and a communication tool for doctors to synthesize responses based on context and clarity.

In an embodiment, the EMRs may include medical history reports, physical examination reports, diagnostic reports, progress notes, consultation reports, operative reports, discharge summaries, medication reports, billing reports, and insurance reports. Examples of the EMRs may correspond to at least one of doctor consultation notes, doctor progress notes, nurses' notes, a prescription history, problem lists, International Classification of Diseases (ICD) codes, laboratory results, pathology reports, X-radiation (X-RAY) reports, computed tomography (CT) reports, magnetic resonance imaging (MRI) reports, ultrasound reports, cardiac catheter reports, or cardiac stress reports associated with at least one user. In another embodiment, the one or more MDG databases 104 may further include records associated with multiple patients, medical facilities, and medical procedures. The medical facilities encompass diverse settings designed to provide healthcare services and support to individuals. The medical facilities may include, but are not limited to, hospitals, clinics, urgent care centers, rehabilitation centers, and nursing homes. The medical procedures may encompass a vast range of interventions performed by healthcare professionals to diagnose, treat, or prevent various health conditions. Such medical procedures may include diagnostic procedures (such as X-rays, CT scans, MRI scans, ultrasounds, and PET scans), surgical procedures (such as laparoscopy, and arthroscopy), therapeutic procedures (such as chemotherapy, and radiation therapy), cardiovascular procedures (such as angioplasty, coronary artery bypass grafting (CABG)), obstetric and gynecological procedures (such as cesarean section, colposcopy), orthopedic procedures (such as joint replacement, fracture repair), and dental procedures (such as fillings and root canals, and extractions).

At 302B, a model application operation may be executed. In the model application operation, the circuitry 202 is configured to apply the one or more LLMs 106 on the received at least one search query. The one or more LLMs 106 translate natural-language queries (e.g., conversational phrases like 'Find sepsis patients') into structured metadata, eliminating rigid syntax requirements while maintaining contextual accuracy. As discussed above, each of the one or more LLMs 106 may be pre-trained models that may be trained to extract metadata based on the received at least one search query. In an embodiment, the one or more LLMs 106 may have been trained on all medical textbooks that may be known in the art. As an example, the one or more LLMs 106 may put together about 65 billion words and may be used to provide all metadata needed for successful research and then provide it back as an interface to humans. Specifically, the one or more LLMs 106 may be used as an interface for the research.

At 302C, a metadata determination operation may be executed. In the metadata determination operation, the circuitry 202 is configured to determine metadata associated with the at least one search query. In an embodiment, the metadata may be determined based on the application of the one or more LLMs 106 on the received search query. The metadata may correspond to information about the data, such as the type of data, the date it was collected, and the patient it is associated with. By indexing the metadata, users (such as doctors) may be able to search for data across MDG databases without having to access the data itself. In an embodiment, the metadata may be required for successful research. Specifically, the one or more LLMs 106 may be used to provide all metadata that are needed for successful research and provide it back as an interface to the user 114. With reference to the first example, the one or more LLMs 106 by itself may find the metadata needed to define sepsis.

At 302D, a keyword determination operation may be executed. In the keyword determination operation, the circuitry 202 is configured to determine at least one keyword from the determined metadata. In an embodiment, the least one keyword is associated with the at least one search query. In an embodiment, the at least one keyword corresponds to one of a name of a user, a name of a medical facility, a name of a disease, or a name of a medical procedure. In an embodiment, the system 102 is configured to apply the one or more LLMs on the determined metadata to further determine the at least one keyword. In another embodiment, the system 102 is configured to apply a natural language processing (NLP) model on the metadata to determine the at least one keyword. With reference to the first example, the at least one keyword may be "Sepsis".

At 302E, a database selection operation may be executed. In the database selection operation, the circuitry 202 is configured to select first MDG database 104A of the one or more MDG databases 104 based on the determined at least one keyword. In an embodiment, each of the one or more MDG databases 104 may be associated with at least one keyword. For example, the first MDG database 104A may include all the information about the patients associated with at least one medical disease (such as sepsis), second MDG database 104B may include medical records associated with the set of patients in a geographic area (such as a city or a town), third MDG database 104C may include details about all the patients, medical equipment, facilities available in at least one medical clinic in the geographic area, and so on.

At 302F, a database query operation may be executed. In the database query operation, the circuitry 202 is configured to query the selected first MDG database 104A of the one or more MDG databases 104. In an embodiment, querying the first medical database 104A may refer to a process of requesting specific information or data from the first medical database 104A. The system 102 is configured to query at least the first MDG database 104A of the one or more MDG databases 104 to retrieve the first medical data associated with the at least one search query.

At 302G, a raw data extraction operation may be executed. In the raw data retrieval operation, the circuitry 202 is configured to extract, from the first MDG database 104A, raw data associated with the determined metadata based on the querying the first MDG database 104A. The raw data may include all the data extracted from the first MDG database 104A that may be associated with the determined at least one keyword. With reference to the first example, the raw data may include a knowledge base associated with the medical disease sepsis, details associated with one or more patients suffering from sepsis in the geographical area, medical facilities offering treatment for sepsis, trends in the people suffering from sepsis, and the like.

At 302H, a medical data retrieval operation may be performed. In the medical data retrieval operation, the circuitry 202 is configured to retrieve the first medical data. In an embodiment, the system 102 is configured to retrieve the first medical data from the extracted raw data. To determine the first medical data, the system 102 is configured to generate one or more constructs associated with the one or more LLMs to be applied on the extracted raw data. The one or more constructs may be associated with the determined metadata. The system 102 is further configured to retrieve the first medical data based on the application of the generated one or more constructs on the extracted raw data. The first medical data may correspond to an appropriate answer to the at least one search query and may be a desired answer to the at least one search query. With reference to the first example, the first medical data may correspond to details associated with one or more patients suffering from sepsis in the geographical area. The details may include a name, an age, a sex, an address, a medical history, and the like associated with the one or more patients suffering from the medical disease sepsis.

At 302I, a medical data output operation may be performed. In the medical data output operation, the circuitry 202 is configured to output the retrieved first medical data. In an embodiment, the output of the retrieved first medical data may correspond to displaying the first medical data on the user device 114. In another embodiment, the output of the first medical data may correspond to storing the first medical data in the one or more MDG databases 104.

In an embodiment, the disclosed system is configured to create thousands of descriptions (permutations of data elements) results using metadata from an LLM Query, from the first medical data governance database. This structured data, associated with the determined metadata, may be expressed as a configuration to LLM in the form of specific language terms and sentences used to train the LLM (English or German, for example). The LLM query may further create a specific syntax for medical data governance, based on the context of the question and previous queries. In accordance with an embodiment, the system may extract, from the first medical data governance database, raw structured data associated with the determined metadata based on querying the first medical data governance database. The system then, based on the query metadata and the raw data, constructs one or more LLM configurations that may be specific to metadata and raw data to be further apply the one or more LLMs. The system may further retrieve the first medical data based on the application of the one or more LLMs on the extracted raw data. The system may further output the retrieved first medical data.

Figure 4:
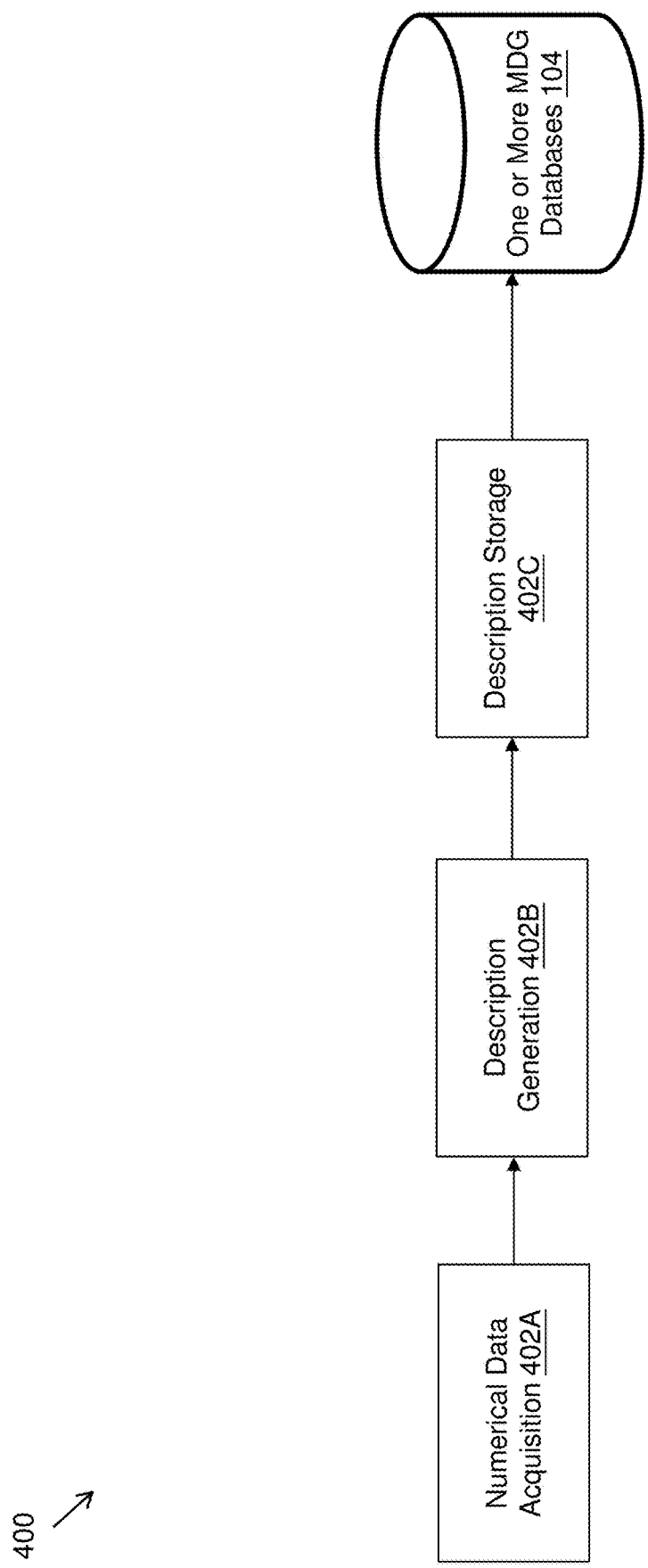
FIG. 4 is a diagram that illustrates exemplary operations for the generation of description associated with numerical data, in accordance with an embodiment of the disclosure.

FIG. 4 is a diagram that illustrates exemplary operations for the generation of description associated with numerical data, in accordance with an embodiment of the disclosure. FIG. 4 is explained in conjunction with elements from FIG. 1, FIG. 2, and FIG. 3. With reference to FIG. 4, there is shown a block diagram 400 that illustrates exemplary operations from 402A to 402C, as described herein. These operations showcase another capability of the system. The exemplary operations illustrated in the block diagram 400 may start at 402A and may be performed by any computing system, apparatus, or device, such as by the system 102 of FIG. 1 or circuitry 202 of FIG. 2. Although illustrated with discrete blocks, the exemplary operations associated with one or more blocks of the block diagram 400 may be divided into additional blocks, combined into fewer blocks, or eliminated, depending on the particular implementation.

At 402A, a numerical data acquisition operation may be performed. In the numerical data acquisition operation, the system 102 is configured to acquire numerical data. The numerical data may refer to information that may be quantifiable and expressed in numerical form. In an embodiment, the numerical data may be captured by one or more medical devices that may be associated with the at least one user.

Each of the one or more medical devices may correspond to instruments, tools, machines, implants, software, or any similar item used for medical purposes, including diagnosis, treatment, monitoring, or prevention of diseases or other health conditions. Examples of the one or more medical devices may include a blood glucose meter, a blood pressure meter, an electrocardiogram (ECG) Monitor, a pulse oximeter, and the like. As a second example, the acquired numerical data may be of "Blood Pressure: 82bpm" or "Blood Oxygen: 98%".

At 402B, a description generation operation may be performed. In the description generation operation, the system 102 is configured to generate a description associated with the received numerical data. The description may be written in the first language and may involve summarizing and presenting the essential characteristics, patterns, and properties of the acquired numerical data. In an embodiment, the system 102 is configured to generate descriptions of all numerical data including time segments, variability, range, distribution, and statistical calculations used in medical papers, publications, and medical documentation related to specific patient conditions. In an embodiment, the system 102 is configured to apply the NLP model to the acquired numerical data. Based on the application of the NLP model, the system 102 is configured to generate the description of the acquired numerical data. With reference to the second example, the generated description of the numerical data "Blood Pressure: 82bpm" may be "The blood pressure of the user may be eighty-two beats per minute".

At 402C, a description storage operation may be performed. In the description storage operation, the system 102 is configured to store the generated description in at least one of the one or more MDG databases 104. The stored description may be used for medical data retrieval as discussed in the FIG. 3.

Figure 5:
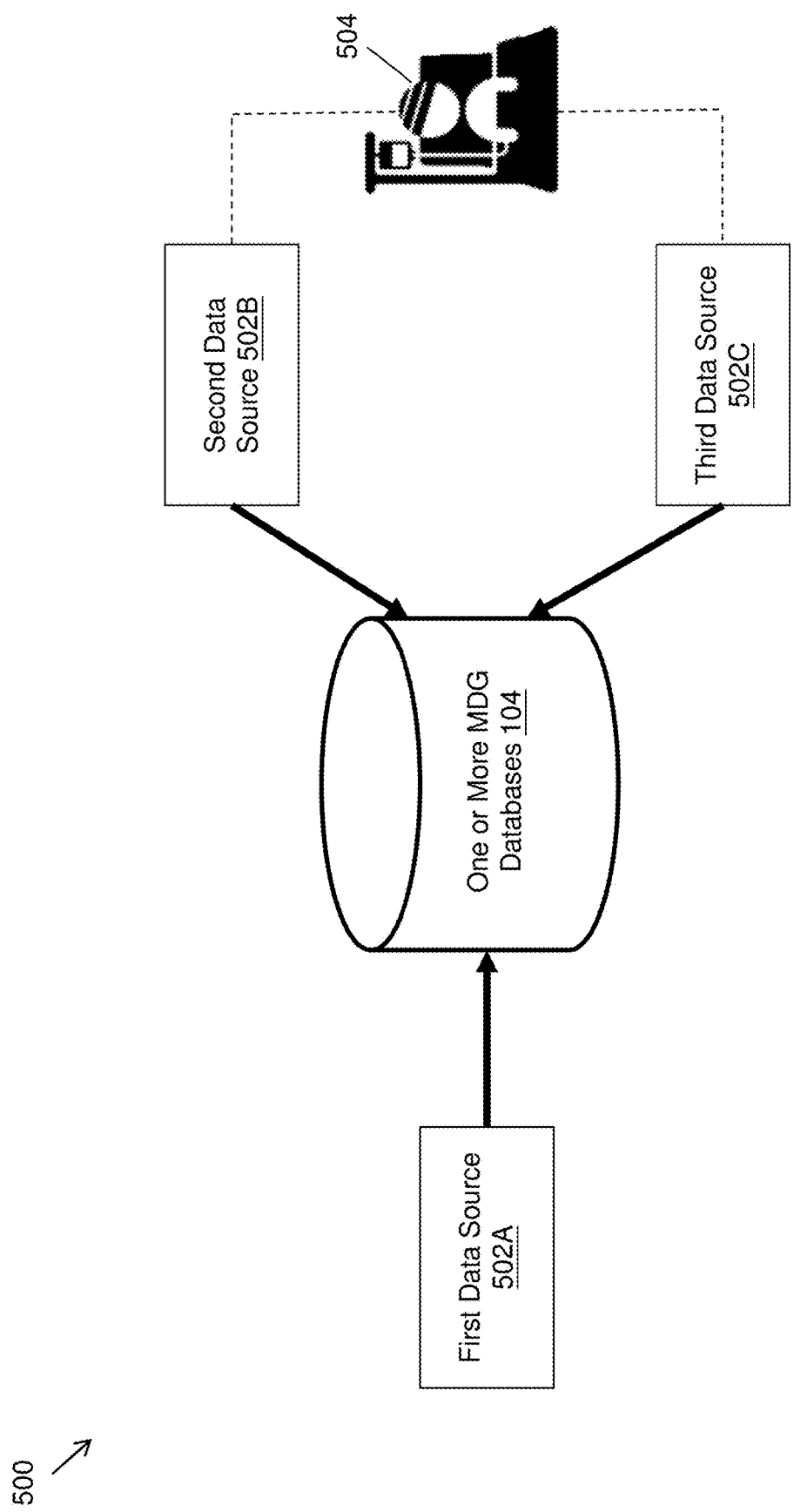
FIG. 5 is a diagram that illustrates a set of data sources for obtaining medical data to be stored in one or more medical data governance databases, in accordance with an embodiment of the disclosure.
Figure 6:
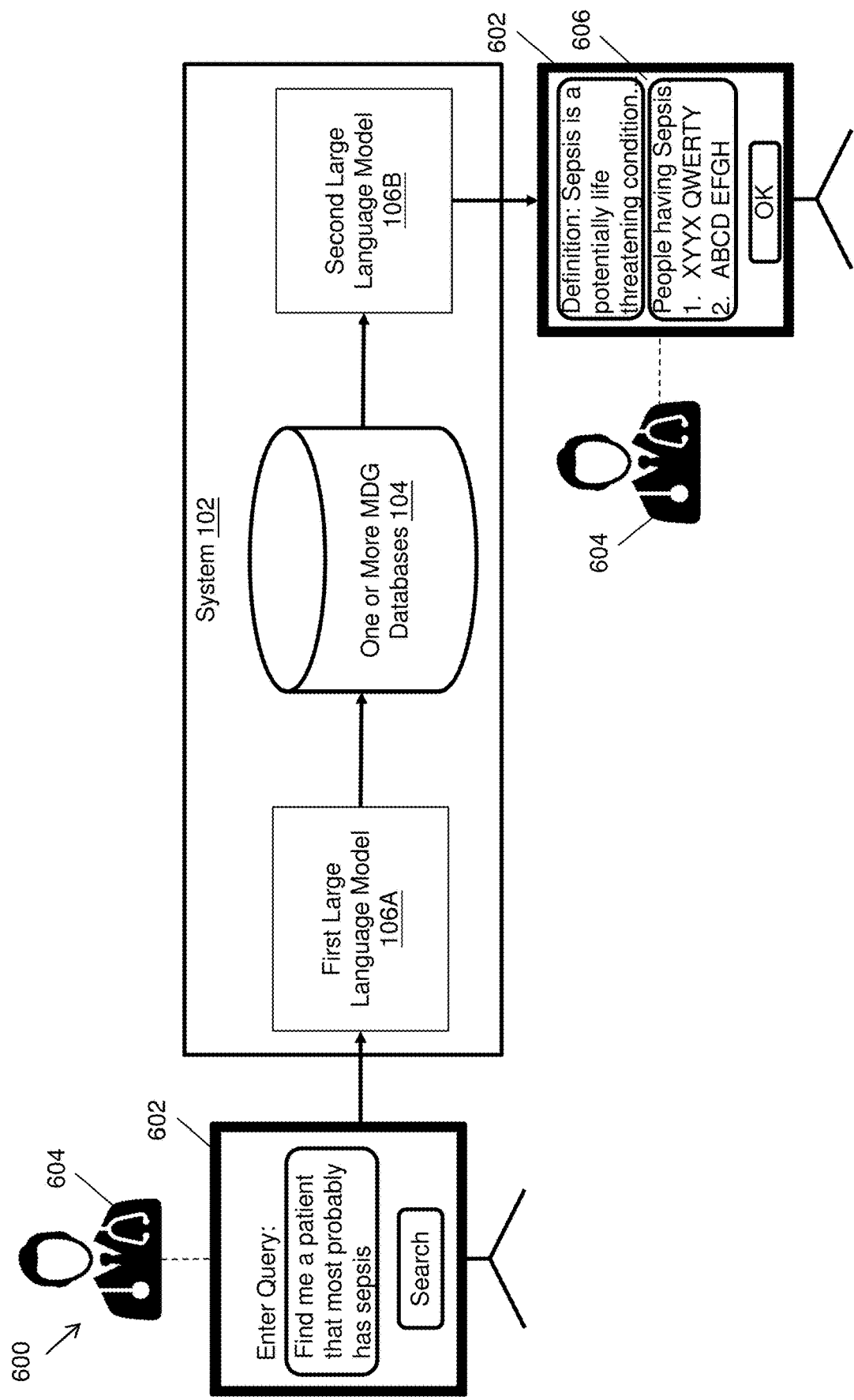
FIG. 6 is a diagram that illustrates an exemplary scenario for an application for medical data governance using large language models, in accordance with an embodiment of the disclosure.

FIG. 5 is a diagram that illustrates a set of data sources for obtaining medical data to be stored in one or more medical data governance databases, in accordance with an embodiment of the disclosure. FIG. 5 is explained in conjunction with elements from FIGS. 1, 2, 3, and 4. With reference to FIG. 5, there is shown a diagram 500 that includes a set of data sources 502 for obtaining medical data to be stored in the one or more MDG databases 104. In an embodiment, the set of data sources 502 may include, but is not limited to, a first data source 502A, a second data source 502B, and a third data source 502C.

In an embodiment, the first data source 502A may correspond to legacy medical knowledge. Specifically, the legacy medical knowledge refers to traditional or historical medical practices, theories, and information that have been passed down through generations and may encompass the methods, beliefs, and treatments used in medicine. In an embodiment, the legacy medical knowledge may include textbooks associated with the medical field, research papers associated with the medical field, patents associated with the medical field, publications associated with the medical field, clinical trials, and research databases, healthcare guidelines, and protocols, medical conferences and symposia, drug databases and formularies, public health reports and epidemiological data, and the like.

In an embodiment, the second data source 502B and the third data source 502C may be associated with at least one patient 504 (of multiple patients). The second data source 502B may correspond to medical data that may be obtained from the one or more medical devices (or equipment) that may be associated with the patient 504 to capture corresponding parameters associated with the patient 504. For example, a smart watch associated with (or worn by) the patient 504 may capture the heart rate of the patient 504 and may further store the captured heart rate of the patient 504 in the one or more MDG databases 104. In some embodiments, the data obtained from the one or more medical devices may include numerical data. In such instances, the system 102 is configured to obtain the numerical data captured by one or more medical devices associated with the patient 504. The system 102 is configured to generate a description associated with the received numerical data and further store the generated description in at least one of the one or more MDG databases 104. Details about the generation of the description are provided, for example, in FIG. 4.

In an embodiment, the third data source 502C may be associated with a patient 504 (of multiple patients) and may correspond to medical data that may be obtained from medical records of the patient 504. Such records may include, but are not limited to, doctor consultation notes, doctor progress notes, nurses' notes, a prescription history, problem lists, International Classification of Diseases (ICD) codes, laboratory results, pathology reports, X-radiation (X-RAY) reports, computed tomography (CT) reports, magnetic resonance imaging (MRI) reports, ultrasound reports, cardiac catheter reports, or cardiac stress reports associated with the patient 504. In an embodiment, the data generated or stored in the one or more MDG databases 104 may be utilized by the system 102 to train the one or more LLMs 106 to increase the performance of the one or more LLMs 106.

To further illustrate the utility of the system, FIG. 6 is a diagram that illustrates an exemplary scenario for an application for medical data governance using large language models, in accordance with an embodiment of the disclosure. FIG. 6 is explained in conjunction with elements from FIGS. 1, 2, 3, 4, and 5. With reference to FIG. 6, there is shown an exemplary scenario 600. There is further shown an electronic device 602 associated with a user 604 who may be a medical professional (for example, a doctor (physician), a nurse, a surgeon, a pharmacist, a dentist, a therapist, and the like). In an embodiment, the user 604 may wish to determine information related to medical field or related to a patient (say the patient 504) whom the user 604 may be treating. The user 604 may enter a query related to medical field or related to a patient (say the patient 504) whom the user 604 may be treating on the electronic device 602. Based on the reception of the query, the electronic device 602 may transmit the query to the system 102 via the communication network 112. By way of a first example and not limitation, the query may be "Find me a patient that most probably has sepsis".

Based on the reception of the query from the electronic device 602, the system 102 is configured to apply the one or more large language models (LLMs) 106 on the received at least one search query. Based on the application of the one or more LLMs 106, the system 102 may determine metadata associated with the at least one search query. The one or more LLMs may be pre-trained to determine metadata associated with the search query. With reference to the first example, the one or more LLMs may find what is the metadata needed to define sepsis. The system 102 is further configured to query the first MDG 104A of the one or more MDG databases 104 based on the determined metadata to retrieve medical data. The medical data may be associated with the search query and may include at least one person who most probably has sepsis. In an embodiment, the system 102 is configured to extract raw data associated with the determined metadata from the first MDG database 104A.

System 102 is further configured to apply the one or more LLMs 106 on the extracted raw data. Specifically, the system 102 is configured to apply the second LLM 106B of the one or more LLMs 106 on the extracted raw data. Based on the application of the one or more LLMs 106 on the extracted raw data, the system 102 is configured to retrieve the first medical data. The retrieved first medical data may correspond to an answer to the query and may include details about at least one patient who might have sepsis. The system 102 is further configured to transmit the retrieved first medical data to the electronic device 602. The electronic device 602 may receive the first medical data and render the first medical data on a user interface (UI) of the user device 606.

In another embodiment, the user 604 may use the system 102 to query information related to the patient 504. For example, the user 604 may use the system 102 to determine whether the patient 504 may have a particular medical condition (say sepsis). In such an embodiment, the system 102 may query the one or more MDG databases 104 that may include information associated with a medical history of the patient. The system 102 may further apply the one or more LLMs on the medical history of the patient and generate a response indicating whether the patient may have a particular medical condition (say sepsis).

In another embodiment, the system 102 is configured to receive real-time medical data associated with at least one user from one or more medical devices associated with (say worn by) the patient 504. Based on the received real-time medical data and the one or more MDG databases, the system 102 is configured to determine at least one upcoming event associated with a medical condition of the patient 504. The system 102 is further configured to output the determined at least one upcoming event on the electronic device 602. In another embodiment, the system 102 may trigger audible or visual notifications indicating the at least one upcoming event. By way of example and not limitation, the system 102 may transmit notifications to user devices (or electronic device 602) (such as smartphones or computer(s)) associated with the user 604 or the patient 504. By way of example and not limitation, the system 102 may receive real-time data associated with the blood pressure of the patient 504 from a smartwatch worn by the patient 504. The received real-time data may indicate an increase in the blood pressure of the patient 504 over a short time period. Based on the received real-time data, and the one or more MDG databases 104 that may include information from legacy medical knowledge, such an increase in blood pressure in a certain time period may be indicative of an upcoming blood pressure attack (or hypertensive crisis). The system 102 may output the determined upcoming blood pressure attack (or hypertensive crisis) on the user device 104. Based on the output of the upcoming blood pressure attack, the user 604 may provide medications to the patient 504 to overcome (or at least to reduce the impact of) the upcoming blood pressure attack. Therefore, the disclosed system 102 may save the lives of the patients automatically without any human intervention.

In another embodiment, the system 102 (or the MDG system) may enable federated search of medical data. The federated search may allow users to search for data across multiple distributed systems without having to centralize the data in one location. This may be important for protecting the privacy of patients and for reducing the administrative burden on hospitals. There may be several different approaches to the federated search of medical data. One important approach of MDG is to generate metadata to index the sensitive data. As discussed above, the metadata is information about the data, such as the type of data, the date it was collected, and the patient it is associated with. By indexing the metadata, the users may be able to search for data across multiple systems without having to access the data itself. Another advantage of the MDG may be that it acts as a centralized storage system for different healthcare systems or medical facilities (such as hospitals) that may be accessed using a query mediator. The query mediator (or the one or more LLMs) may be a component that may acts as an intermediary between the user and the distributed MDG subsystems. The query mediator component receives the user's search query and forwards it to the relevant MDG subsystems, providing unifying results back to the user.

Some specific examples of how federated search of medical data is used may include a researcher searching for data on patients with a particular disease across multiple hospitals. This could help the researcher to identify new risk factors for the disease or to develop new treatments. Another example may be that a clinician may search for data on patients who have had a particular surgery across multiple hospitals. This could help the clinician to learn from the experiences of other surgeons and to improve their surgical outcomes. Another example may be that a patient may search for data on his/her medical history across multiple hospitals. This could help the patient to better understand their health and to make informed decisions about their care. Therefore, MDG federated search of medical data may be a powerful tool that may be used to improve patient care and to advance medical research. MDG may be essential for enabling federated search in a secure and privacy-preserving manner.

In addition to these general benefits, MDG can also provide a number of specific benefits for research, such as facilitating data sharing, supporting the development of new research methods, and promoting the translation of research findings into clinical practice. Specifically, MDG may facilitate data sharing between researchers, which can help to accelerate research and improve the quality and impact of research findings. MDG may also support the development of new research methods, such as the use of machine learning and artificial intelligence to analyze large datasets. Furthermore, MDG may also help to promote the translation of research findings into clinical practice by ensuring that data is collected and stored in a way that is compatible with clinical systems. The specific value of MDG for research on patient medical data is that it may allow researchers to access and use large datasets of patient data without compromising the privacy of individual patients. This is possible because MDG may ensure that data is de-identified before it is used for research. Such de-identified patient medical data may be used to conduct a wide range of research studies, including clinical trials, Observational studies, and Basic science research. Therefore, MDG may be essential for ensuring that medical data is used responsibly and ethically for research. This is important for protecting the privacy of patients, ensuring the quality of data, promoting the ethical use of data, and accelerating the development of new medical treatments and cures.

Federated Compliance System Components and Architecture

The architecture is built from interoperable modules that collectively enforce secure, auditable, and policy-driven control over digital artifacts and their companion compliance tokens as they traverse institutional boundaries. Working in concert, these modules furnish continuous governance, dynamic token inheritance, real-time regulatory enforcement, and automated monetization throughout each artifact's creation, transfer, and access across multi-organizational workflows. The core elements that enable this cross-institutional governance are illustrated in FIGS. 7-9.

As illustrated in FIG. 7, at the heart of the system are the Proxied Security Token Generator (also referred to as the federated compliance-token generator) located within the supervisory nodes 751 and the token inheritance module 752. The Proxied Security Token Generator creates federated compliance tokens for each persona-agent session or output. Each token contains a delegation chain, credential lineage, policy snapshot, monetization policy, expiration, a revocation pointer, and a digital signature. The token inheritance module 752 manages the transfer, renewal, and revocation of these tokens as workflows move across organizations or supervisory nodes. Token inheritance module 752 is a system component or process that manages the transfer, renewal, or revocation of compliance tokens between entities (e.g., between agents, organizations, or workflow nodes), ensuring immutability and preservation of compliance lineage and credential history. All token delegation, issuance, and revocation events are immutably recorded in the token audit trail (755), and any status changes are reflected by the token revocation pointer (756)—a digital field or mechanism within the compliance token and registry that enables tokens to be invalidated or revoked centrally or across institutions, with updates propagated to all linked audit and registry records.

As shown in FIGS. 7 and 9, Persona Agent Instances and a Digital Artifact Generator, are instantiated to process prompts or workflow events. These agents (753, 754, 951) operate within the policy, credential, and consent boundaries enforced by their associated compliance tokens to generate digital artifacts 952. Each digital artifact is cryptographically signed and includes full provenance, credential, policy, and service metadata, which uniquely links every output to its governing compliance token.

As depicted in FIG. 8, to ensure data privacy, an edge inference engine 852 and privacy boundary 853 is implemented. Edge inference engine is a local computing module that processes sensitive inputs (e.g., sensor, biometric, or clinical data) and applies privacy boundaries, ensuring that only derived, non-sensitive metadata is transmitted downstream, with full audit logging of all policy enforcement events. Sensor inputs, such as clinical measurements, images, or biometric data 851, are processed locally by an edge inference engine 852. A privacy boundary 853 ensures that only derived metadata or policy-compliant information 854 is forwarded to downstream workflow node 857, while the sensitive source data is retained at the edge. Policy enforcement flags 856 indicate actions taken, and all privacy-related events are meticulously logged by the audit logging module 855.

As per FIG. 9, a Distributed Asset Registry and Ledger serves as the system's immutable record. The asset registry 953 functions as a decentralized, tamper-evident ledger or blockchain, recording every digital artifact's creation, ownership, transfer, access, consent status, and associated policy events. Consent status is a digital field or cryptographically linked record indicating that appropriate user, patient, or regulatory consent has been obtained for the creation, transfer, or use of a digital artifact or token, with all updates immutably logged in the registry. The registry is cryptographically linked to the compliance tokens, enabling comprehensive provenance tracking and simplifying regulatory audits. The audit ledger 955 provides an immutable, time-stamped, and digitally signed record of all system operations. The audit ledger (also referred to as audit subsystem) is a system module or distributed ledger for generating, chaining, and storing tamper-evident audit records of all relevant operations—including token generation, artifact creation, transfer, billing, policy enforcement, and failover.

In FIG. 9, for financial transactions, a monetization engine 954 and Smart Contract Enforcement mechanism is included. This monetization engine 954 enforces automated billing, royalty payments, or revenue-sharing for artifact access or usage by executing programmable policy logic or smart contracts. Billing calculations can incorporate usage metrics, user roles, institutional agreements, and regulatory compliance factors, with all outcomes recorded in the distributed registry. A service identifier tag 957 associates each artifact with its applicable billing code or policy.

In FIG. 9, to handle sensitive or policy-triggering events, a supervisor review interface 956 is provided. Such events, including artifact transfers, billing, or access requests, can be escalated to a supervisor review interface 956, where authorized users can review, approve, reject, or annotate transactions or digital artifacts flagged for policy, risk, or credential reasons. User consent and privacy status are cryptographically linked to both compliance tokens and digital artifacts, ensuring that all transfers or uses are automatically checked for appropriate consent and regulatory approval.

Finally, the system is designed for failover and operational continuity. Should any component, registry node, or workflow be disrupted, the system enables seamless failover by generating and transferring a role-switch token that is a mechanism for ensuring operational continuity in the asset registry or artifact management system, allowing a peer node to assume responsibility in the event of a device or node failure, with the transition cryptographically recorded and authorized by a role-switch token. Basically, this ensures continuity of artifact management and audit logging. All such transitions are cryptographically logged and linked to the affected artifacts and tokens, maintaining a complete and unbroken chain of custody and compliance. These components extend and interoperate with the persona agent mesh, memory governance, policy engine, audit, and failover mechanisms, providing a unified, scalable platform for cross-organizational governance and monetization of AI-generated outputs. In the disclosed system, every data input is first cryptographically time-stamped, source-verified, and semantically annotated by the MDG governance substrate, establishing an Input Chain-of-Trust that is a process and data structure whereby every data input, prior to use by a persona agent, is cryptographically timestamped, source-verified, and semantically labeled, with this provenance record persistently and immutably linked to all subsequent agent actions, outputs, artifacts, and audits or registry events. Thus, for any agent decision or digital artifact, it is possible to reconstruct and verify the full provenance and context of the underlying inputs, providing tamper-evident, human-verifiable traceability from decision to data origin.

Exemplary Use Cases and Operational Scenarios

In one exemplary scenario, a hospital patient provides digital consent for a complex procedure via a persona agent running at the point of care. The system generates a digital artifact (FIG. 9, 952) that is cryptographically linked to a federated compliance token containing the full delegation chain, credential lineage, and policy snapshot. This artifact is then registered in the asset registry (FIG. 9, 953), and an expiration and revocation pointer are encoded within the token (FIG. 7, 756). When a specialist at a remote institution requests access, the token inheritance module first triggers automated validation of the specialist's credentials and applicable policy at the remote site; only after successful validation does it securely transfer the compliance token and associated artifact, recording both the validation and transfer events immutably in the audit ledger (FIG. 9, 955).

Any subsequent access, modification, or revocation of the consent artifact is logged, and all involved parties are notified, providing complete regulatory traceability.

In another use case, as per FIG. 9, a clinical persona agent 951 generates a diagnostic report as a digital artifact 952 during a cross-institutional collaboration. Upon each access or use of this artifact, the monetization engine 954 computes billing or royalty fees based on real-time usage, the user's role, and institutional agreements. Service identifier tags 957 ensure the correct policy and billing codes are assigned. Basically, service identifier tag is a digital identifier uniquely linking each digital artifact to a service type, billing code, or institutional policy within the registry and billing systems. All monetization and billing events are immutably recorded in the asset registry 953 and the audit ledger 955, and smart contracts automatically distribute revenue according to pre-defined organizational rules. Supervisory review (956) may be required for high-value or sensitive transactions to ensure compliance and auditability.

The system also robustly handles policy changes and system failures. During a federated workflow, if a compliance issue is detected or a policy is updated that affects token validity, the revocation pointer (FIG. 7, 756) is triggered. This invalidates the affected compliance token (752) and automatically updates all associated artifact registry entries (FIG. 9, 953) and audit logs (955). If the primary registry node or workflow controller fails, the system issues a role-switch token, transferring operational responsibility to a designated backup node, with all transitions and policy re-evaluations immutably audit-logged for continuity and regulatory compliance.

Regarding privacy, as per FIG. 8, sensor data 851, such as biometric or voice input, is processed locally by the edge inference engine 852. The privacy boundary 853 ensures only derived metadata 854 is forwarded, while the original sensitive data remains local. Policy enforcement flags 856 and the audit logging module 855 document the privacy controls applied. When the derived artifact is registered and transferred, the system checks for required user consent (linked to the artifact and token) before granting access. If consent is revoked, the revocation is instantly reflected in the registry and token status, blocking further access and generating audit notifications to all affected entities.

For regulatory oversight, an auditor can query the distributed asset registry (FIG. 9, 953) and audit ledger (FIG. 9, 955) to obtain a tamper-evident, cryptographically chained record of every token creation, artifact generation, transfer, billing, consent, policy change, and revocation event. Each event is linked to the appropriate delegation chain and credential lineage (FIG. 7, 755), allowing for real-time verification of provenance and regulatory fields across a multi-hospital network.

Alternative Embodiments and Configurations

The invention described herein is not limited to the specific architectures or workflows illustrated in FIGS. 7-9, but encompasses a range of alternative embodiments and operational configurations. In some embodiments, the proxied security token (FIG. 7, 752) may include additional data fields such as context-specific regulatory approvals, time-bounded usage rights, or organization-specific consent requirements. The token inheritance module can support multi-tiered delegation or cyclical revocation workflows, allowing for flexible delegation chains (FIG. 7, 755) and dynamic policy adjustment in response to regulatory updates or risk events.

As illustrated in FIG. 9, the digital artifact generator that is located within persona agent instance 951 can be configured to create various types of outputs—including, but not limited to, patient consents, transaction logs, audit certificates, or automated clinical reports—each incorporating the required credential, policy, and consent metadata. In other deployments, the asset registry 953 may be implemented using alternative distributed ledger technologies, including permissioned blockchains, federated databases, or hybrid architectures, and may support off-chain storage pointers for scalability. The monetization engine 954 may integrate with external billing platforms, payment gateways, or royalty calculation services, and smart contract enforcement can be extended to handle variable pricing, dynamic contract negotiation, or usage-based discounting. Supervisor review interfaces 956 can be implemented as human, AI, or hybrid digital workflows, providing additional flexibility for organizations with unique compliance requirements.

For environments where privacy and data locality are paramount, in FIG. 8, the edge inference engine 852 and privacy boundary 853 may be further enhanced with federated learning, homomorphic encryption, or confidential computing modules, ensuring that raw data never leaves the originating device or institution, and that only the minimal required metadata is transmitted or stored. Failover and operational continuity can be adapted for cloud-native, on-premises, or hybrid deployments, with the role-switch token logic extended to include geofencing, automated escalation, or disaster recovery protocols. The distributed audit subsystem (referred to as audit ledger—FIG. 9, 955) may be synchronized at configurable intervals, support selective disclosure for regulatory review, or implement advanced tamper-detection and remediation mechanisms. Beyond healthcare, the invention is readily adaptable for use in finance, supply chain, legal, government, or academic environments—any domain requiring automated, secure, and auditable transfer, monetization, and compliance management for AI-generated digital assets across organizational boundaries.

System Implementation and Architecture

The invention can be implemented as an integrated combination of software modules and hardware platforms, leveraging secure, decentralized, and distributed computing environments to ensure compliance, auditability, and operational resilience. Each persona agent session or output triggers the generation of a federated compliance token, a process handled by the Proxied Security Token Generator located in supervisory node 751. This token comprises the delegation chain, credential lineage, policy snapshot, monetization policy, a digital signature, an expiration, and a revocation pointer 756. The token generation and updates are performed by a software module executing cryptographic signing, policy validation, and credential aggregation. The token inheritance module is implemented as a secure logic layer or distributed service, enabling token transfer, renewal, or revocation as agent workflows cross institutional boundaries or supervisory nodes 751. Each token transaction is immutably recorded in a token audit trail 755 and synchronized across participating entities.

Persona agent instances (753, 754, 951) run on secure, policy-enforced computing platforms—such as edge servers, clinical workstations, or cloud nodes—where they process prompts or workflow events to generate digital artifacts 952. The digital artifact generator module that is located within persona agent instance 951 signs each artifact and embeds provenance, credential, and policy metadata from the linked compliance token, ensuring every artifact is uniquely and immutably associated with its policy context. Sensor inputs 851 are locally processed by an edge inference engine 852, which applies machine learning or policy-driven analytics to derive non-sensitive metadata (in privacy boundary 853) for downstream workflow nodes 857. A privacy boundary 853 restricts external transmission of sensitive source data, while audit logging 855 and policy enforcement flags (856) provide proof of compliance with privacy and regulatory rules.

Within each Persona agent, an enforcement logic is a deterministic rule set that governs every runtime decision involving a received policy token. When a token arrives, the enforcement logic (i) verifies the token's cryptographic signature against the current supervisor-issued validation checkpoint; (ii) parses embedded metadata—including delegation chain, access-permission matrix, consent status, monetization constraints, expiration, and revocation pointer—against the node's own credential context; (iii) permits, denies, or transforms incoming data streams, agent prompts, and outbound digital-artifact writes according to those rules and any jurisdictional overlays; (iv) triggers immediate token renewal or revocation, and cascades the updated state through the federated-propagation subsystem, upon detection of consent withdrawal, credential lapse, policy supersession, or supervisory override; and (v) reconciles token state with peer nodes via an inter-agent consensus routine whenever a conflict or network partition is detected. This closed-loop workflow ensures that access control, consent revocation, monetization terms, and policy inheritance remain synchronized and provably enforced across all distributed nodes—even under adverse network conditions or malicious interference.

Digital artifacts 952 and their associated compliance tokens are registered in an asset registry 953, which is implemented as a distributed ledger or blockchain to provide immutable, tamper-evident, and cryptographically chained records of artifact creation, ownership, transfer, access, monetization, consent, and provenance. Each ledger entry is digitally signed and time-stamped, and the registry supports programmable APIs for artifact query, transfer, and audit operations. The audit ledger 955 records every transaction, policy change, billing event, and revocation, supporting regulatory and forensic traceability.

The monetization engine 954 is a programmable software module or smart contract system that calculates billing, royalties, or revenue-sharing based on artifact usage, institutional agreements, and policy requirements. It supports integration with external billing platforms and payment systems and is capable of real-time updates to the asset registry and audit ledger upon each monetization event. Service identifier tags 957 ensure correct policy, billing, or revenue code linkage. The supervisor review interface 956 can be implemented as a secure web or application portal, presenting authorized users or digital supervisors with flagged transactions or policy exceptions for approval, annotation, or rejection. Consent and privacy status are cryptographically embedded in both the artifact and compliance token and are automatically checked prior to any artifact transfer, use, or monetization event.

Failover logic monitors the health of the registry, artifact generator, and monetization engine 954. In the event of an operational interruption, a role-switch token is generated and cryptographically signed to transfer responsibility to a designated backup node. All failover and continuity events are recorded in the audit ledger and asset registry, ensuring no loss of compliance or auditability. All communications between system components use end-to-end encryption and mutual authentication. Tokens, artifacts, and registry entries are digitally signed. The system is designed to comply with healthcare, financial, and privacy regulations such as HIPAA and GDPR, supporting configurable policies, selective disclosure, and audit remediation. System modules can be deployed on-premises, in the cloud, or in hybrid configurations, and the architecture supports interoperability with legacy systems and external compliance, audit, and billing platforms via standards-based APIs.

Technical Advantages

The present invention provides a comprehensive and technically advanced solution to longstanding challenges in digital compliance, auditability, asset management, and monetization for AI-generated outputs in regulated, multi-institutional environments. In contrast to prior systems, which typically offer only isolated components such as basic audit logs, digital signatures, or traditional asset registries, this invention achieves a novel and integrated framework with the following advantages.

First, the invention introduces an integrated federated compliance token architecture. It uses a proxied security token mechanism that uniquely encapsulates the delegation chain, credential lineage, policy snapshot, monetization logic, and digital signature within each token. Token generation, inheritance, revocation, and renewal are automated and fully auditable, supporting complex, cross-organizational workflows and ensuring compliance state is preserved at every step.

Second, it provides an immutable digital artifact registry and provenance. By registering digital artifacts (FIG. 9, 952) in a tamper-evident, distributed asset registry 953, the invention guarantees immutable provenance, ownership, consent, and access history. Every artifact is cryptographically linked to its originating compliance token, creating an end-to-end traceable chain for audit and regulatory review.

Third, it enables dynamic, policy-driven monetization. The monetization engine (954) allows for automated, policy-driven billing, royalty, and revenue-sharing arrangements, with real-time updates to the distributed ledger. Smart contract enforcement eliminates the need for manual reconciliation, supports usage-based pricing, and enables secure, automated financial transactions across organizational boundaries.

Fourth, it incorporates privacy-preserving edge processing and consent enforcement. The edge inference engine (FIG. 8, 852) and privacy boundary (FIG. 8, 853) ensure that only policy-compliant, non-sensitive data is transmitted or registered. Consent and privacy status are cryptographically enforced and checked for every artifact transfer or use, preventing unauthorized access and supporting privacy regulations such as HIPAA and GDPR.

Fifth, the system features automated failover and operational resilience. Failover and role-switch logic provide robust operational continuity, with cryptographically logged transitions and audit updates, even in the event of system faults, network outages, or registry node failures. This is complemented by an end-to-end, cryptographically linked audit trail, where all events are immutably logged in a distributed, chained audit ledger (FIG. 9, 955), enabling real-time regulatory reporting and forensic traceability. Finally, its scalability and domain flexibility allow the modular architecture to support integration with legacy systems and adapt beyond healthcare to finance, government, supply chain, research, and any domain requiring automated, auditable, and monetizable AI-generated asset management.

Further Embodiments and General Principles

Various embodiments of the disclosure comprise the system 102 for medical data governance using large language models. The system 102 may comprise, for example, the circuitry 202, the memory 204, the I/O device 206, and the network interface 208, and/or the inference accelerator 210. The circuitry 202 of the system 102 is configured to receive a user input including at least one search query to retrieve first medical data from one or more MDG databases 104. The circuitry 202 is further configured to apply one or more large language models (LLMs) 106 on the received at least one search query. The one or more LLMs 106 may be pre-trained models. The circuitry 202 of the system 102 is further configured to determine metadata associated with the at least one search query based on the application of the one or more LLMs 106 on the received search query. The circuitry 202 of the system 102 is further configured to query the first MDG database 104A of the one or more MDG databases 104 based on the determined metadata to retrieve the first medical data and output the retrieved first medical data.

Certain embodiments of the disclosure may be found in a system, a method, and an electronic device for medical data governance using large language models. In such embodiments, the system includes circuitry configured to receive a user input including at least one search query to retrieve first medical data from one or more medical data governance (MDG) databases. The system is further configured to apply one or more large language models (LLMs) on the received at least one search query, where the LLMs are pre-trained models. The system then determines metadata associated with the search query based on the application of the LLMs and queries a first MDG database based on the determined metadata to retrieve and output the first medical data.

In accordance with an embodiment, the system is configured to extract, from the first MDG database, raw data associated with the determined metadata. The system can then generate one or more constructs associated with the LLMs to be applied on the extracted raw data, where these constructs are associated with the determined metadata. The system then retrieves the first medical data based on the application of these generated constructs on the extracted raw data and outputs the result.

In accordance with an embodiment, the one or more medical data governance (MDG) databases comprise electronic medical records associated with at least one user. These electronic medical records may correspond to at least one of: doctor consultation notes, doctor progress notes, nurses' notes, a prescription history, problem lists, International Classification of Diseases (ICD) codes, laboratory results, pathology reports, X-radiation (X-RAY) reports, computed tomography (CT) reports, magnetic resonance imaging (MRI) reports, ultrasound reports, cardiac catheter reports, or cardiac stress reports associated with at least one user.

In accordance with an embodiment, the system can acquire numerical data captured by one or more medical devices associated with at least one user, generate a description associated with the received numerical data, and store the generated description in at least one of the MDG databases. The system may also receive real-time medical data from such devices and determine at least one upcoming event associated with a medical condition of the user based on the received data and the MDG databases, and then output the determined event. In a further embodiment, the system can determine at least one keyword from the determined metadata to select the appropriate MDG database to query. This keyword may correspond to a name of a user, a medical facility, a disease, or a medical procedure.

In accordance with an embodiment, the proxied security token illustrated in FIG. 7 (752) is extensible, permitting the inclusion of context-specific regulatory approvals, jurisdictional constraints, and explicit time-bounded usage rights. As further shown in FIG. 9, the distributed asset registry 953 may be realized on a permissioned blockchain, a federated database cluster, or a hybrid ledger architecture, thereby accommodating diverse governance, throughput, and data-residency requirements. The Monetization Engine (954) is similarly adaptive and can, in certain embodiments, execute programmable policy logic that negotiates variable-rate pricing, usage-based discounts, and dynamic contract terms in real time. The supervisor review interface 956 may be implemented as a human-centric workflow, an autonomous AI reviewer, or a collaborative human-AI arrangement, depending on institutional policy and risk tolerance. Finally, the edge inference engine (depicted in FIG. 8, 852) can, in some embodiments, incorporate homomorphic encryption or other confidential-computing techniques, ensuring that raw sensor data remain protected—even during algorithmic processing—while only policy-compliant, derived metadata are propagated downstream.

To encapsulate the technical breadth of the foregoing disclosure—the present invention delivers a cohesive system and method for federated governance, inheritance, and monetization of digital artifacts produced by AI-driven persona agents operating in compliance-sensitive domains. Each agent output is bound to a proxied security token that cryptographically embeds the full delegation chain, credential lineage, real-time policy snapshot, monetization logic, and an irrevocable digital signature. Upon creation, every artifact is enrolled in a distributed asset registry, where immutable links are formed among provenance data, patient or user consent, and the originating compliance token. The platform orchestrates automated token transfer, renewal, and revocation; enforces role-based billing and smart-contract settlements; and accommodates cross-organizational workflows without sacrificing privacy. Edge-side inference engines perform policy-driven metadata extraction so that only de-identified or transformed information leaves the originating device or institution. All token events, artifact mutations, registry updates, financial transactions, consent changes, and supervisory actions are written to a tamper-evident, cryptographically chained audit ledger, providing regulators and stakeholders with continuous, end-to-end traceability. Collectively, these capabilities deliver a secure, auditable, and policy-compliant framework for creating, sharing, and monetizing AI-generated digital assets across diverse institutional boundaries.

As utilized herein, the term "exemplary" means serving as a non-limiting example, instance, or illustration. As utilized herein, the terms "for example," and "for example" set off lists of one or more non-limiting examples, instances, or illustrations. As utilized herein, circuitry is "operable" to perform a function whenever the circuitry comprises the necessary hardware and/or code (if any is necessary) to perform the function, regardless of whether performance of the function is disabled, or not enabled, by some user-configurable setting.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (for example, application specific integrated circuits (ASICs)), by program instructions being executed by one or more processors, or by a combination of both. Additionally, these sequences of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter.

Another embodiment of the disclosure may provide a non-transitory machine and/or computer-readable storage and/or media, having stored thereon, a machine code and/or a computer program having at least one code section executable by a machine and/or a computer, thereby causing the machine and/or computer to perform the steps as described herein for generating a novel molecular structure using a protein structure.

The present disclosure may also be embedded in a computer program product, which comprises all the features enabling the implementation of the methods described herein, and which when loaded in a computer system is able to carry out these methods. Computer program in the present context means any expression, in any language, code or notation, either statically or dynamically defined, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithms, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, physical and/or virtual disk, a removable disk, a CD-ROM, virtualized system or device such as a virtual server or container, or any other form of storage medium known in the art. An exemplary storage medium is communicatively coupled to the processor (including logic/code executing in the processor) such that the processor can read information from, and write information to, the storage medium. In the alternative, the storage medium may be integral to the processor.

While the present disclosure has been described with reference to certain embodiments, it will be noted understood by, for example, those skilled in the art that various changes and modifications could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated. Therefore, it is intended that the present disclosure is not limited to the particular embodiment disclosed, but that the present disclosure will include all embodiments falling within the scope of the appended claims.

The invention claimed is:

1. A system for federated compliance, inheritance, and monetization of digital artifacts generated by persona agents in a regulated environment, the system comprising at least one hardware processor and a non-transitory computer-readable medium storing instructions that, when executed by the processor, enable the system to implement:

a federated compliance token generator creating, for each persona-agent session, a cryptographically signed compliance token comprising a delegation chain, credential lineage, policy snapshot, monetization policy, expiration, revocation pointer, and digital signature, the token being uniquely bound to an originating agent's credential and session context, said compliance token further comprising a token revocation pointer referencing a revocation list stored in the asset registry, the pointer enabling real-time invalidation of the token and all artifacts linked thereto;

a token inheritance module transferring, subdividing, renewing, or revoking the compliance token as workflows traverse organizational or jurisdictional boundaries, and appending each such event to a cryptographically linked token audit trail while preserving credential lineage and policy constraints;

a digital artifact generator producing, for each agent output, a digitally signed digital artifact that is cryptographically linked to the originating compliance token and embeds provenance, credential, policy, consent, and service metadata;

an asset registry implemented as a permissioned blockchain or sharded distributed ledger, the registry immutably storing and indexing the digital artifacts, the associated compliance tokens, and chronologically ordered entries recording creation, ownership, transfer, access, consent, revocation, and policy-change events;

a monetization engine coupled to the asset registry, the engine executing smart-contract billing logic defined in the monetization policy of each compliance token so as to allocate revenue or royalties based on artifact usage, access patterns, and institutional agreements, each billing event being written atomically to the asset registry; and an audit subsystem immutably logging, as tamper-evident, cryptographically-chained ledger entries, every compliance-token operation, digital-artifact lifecycle event, access or transfer action, registry or policy update, and monetization transaction, furnishing continuous end-to-end traceability for regulatory oversight.

2. The system of claim 1, wherein the digital artifact generator includes an edge inference engine executing within a privacy boundary that locally processes raw sensor or biometric inputs and outputs only de-identified metadata for inclusion in the digital artifact, enforcing data minimization and privacy regulations.

3. The system of claim 1, wherein the token inheritance module further subdivides a parent compliance token into a plurality of child tokens, each child token inheriting at least a portion of the delegation chain, credential lineage, and monetization policy, and wherein each subdivision event is immutably recorded in the token audit trail.

4. The system of claim 1, wherein the asset registry employs a consensus protocol among a plurality of ledger nodes and, upon detection of a node failure, issues a role-switch token that authorizes a backup node to assume registry responsibilities, the issuance of the role-switch token being cryptographically logged by the audit subsystem.

5. The system of claim 1, wherein the monetization engine assigns service identifier tags to digital artifacts and distributes revenue among multiple institutional wallets via deterministic smart contracts that reference the tags and the monetization policy embedded in the corresponding compliance token.

6. The system of claim 1, further comprising a supervisor review interface presenting transactions flagged by policy rules for human or AI review, approval, or rejection, an outcome of each review being cryptographically bound to the corresponding artifact and token and stored in the asset registry.

7. The system of claim 1, wherein the audit subsystem supports selective disclosure by generating cryptographic attestations that verify compliance for a requested event set without exposing protected patient or financial data.

8. The system of claim 1, wherein the asset registry maintains a user-consent status linked to each digital artifact and automatically denies access to an artifact when the corresponding consent is withdrawn, the denial event being immutably logged.

9. The system of claim 1, wherein the federated compliance token generator, token inheritance module, digital artifact generator, asset registry, monetization engine, and audit subsystem are each implemented as network-addressable microservices executing within containerized runtime environments that communicate over mutually authenticated, end-to-end encrypted channels.

10. A computer-implemented method for federated compliance, inheritance, and monetization of digital artifacts generated by persona agents in a regulated environment, the method comprising:

creating, for each persona-agent session, a cryptographically signed compliance token that includes a delegation chain, credential lineage, policy snapshot, monetization policy, expiration, revocation pointer, and digital signature, the token being uniquely bound to the originating agent's credential and session context, said compliance token further comprising a token revocation pointer referencing a revocation list stored in the asset registry, the pointer enabling real-time invalidation of the token and all artifacts linked thereto;

transferring, subdividing, renewing, or revoking the compliance token as workflows traverse organizational or jurisdictional boundaries, and appending each such event to a cryptographically linked token-audit trail while preserving credential lineage and policy constraints;

producing, for each agent output, a digitally signed digital artifact that is cryptographically linked to the originating compliance token and embeds provenance, credential, policy, consent, and service metadata;

storing and indexing the digital artifact, the associated compliance token, and chronologically ordered entries recording creation, ownership, transfer, access, consent, revocation, and policy-change events in an asset registry implemented as a permissioned blockchain or sharded distributed ledger;

executing, by a monetization engine operatively coupled to the asset registry, smart contract billing logic defined in the monetization policy of the compliance token so as to allocate revenue or royalties based on artifact usage, access patterns, and institutional agreements, each billing event being written atomically to the asset registry; and logging immutably, as tamper-evident, cryptographically chained ledger entries, every compliance-token operation, digital-artifact lifecycle event, access or transfer action, registry or policy update, and monetization transaction, furnishing continuous end-to-end traceability for regulatory oversight.

11. The method of claim 10, further comprising embedding in the compliance token a revocation pointer that references a revocation list stored in the asset registry, the pointer enabling real-time invalidation of the token and all artifacts linked thereto.

12. The method of claim 10, wherein producing the digitally signed digital artifact further comprises locally processing raw sensor or biometric inputs within an edge inference engine operating inside a privacy boundary and outputting only de-identified metadata for inclusion in the artifact, enforcing data-minimization and privacy regulations.

13. The method of claim 10, further comprising subdividing a parent compliance token into a plurality of child tokens, each child token inheriting at least a portion of the delegation chain, credential lineage, and monetization policy, and immutably recording each subdivision event in the token-audit trail.

14. The method of claim 10, further comprising employing a consensus protocol among a plurality of ledger nodes and, upon detection of a node failure, issuing a role-switch token that authorizes a backup node to assume registry responsibilities, the issuance of the role-switch token being cryptographically logged.

15. The method of claim 10, wherein executing the smart-contract billing logic further comprises assigning service-identifier tags to digital artifacts and distributing revenue among multiple institutional wallets via deterministic smart contracts that reference the tags and the monetization policy embedded in the corresponding compliance token.

16. The method of claim 10, further comprising presenting, via a supervisor review interface, transactions flagged by policy rules for human or AI review, approval, or rejection, and cryptographically binding an outcome of each review to the corresponding artifact and token and storing the outcome in the asset registry.

17. The method of claim 10, wherein logging further comprises generating cryptographic attestations that enable selective disclosure and verify compliance for a requested event set without exposing protected patient or financial data.

18. The method of claim 10, further comprising maintaining, in the asset registry, a user-consent status linked to each digital artifact and automatically denying access to an artifact when a corresponding consent is withdrawn, the denial event being immutably logged.

19. The method of claim 10, wherein each step is executed by network-addressable microservices running in containerized runtime environments that communicate over mutually authenticated, end-to-end encrypted channels.

* * * * *